US012630307B2

(12) United States Patent　　　(10) Patent No.: US 12,630,307 B2
Mukae　　　　　　　　　　　　(45) Date of Patent: May 19, 2026

(54) SPACE TRAFFIC MANAGEMENT METHOD, COLLISION AVOIDANCE ASSIST BUSINESS DEVICE, SPACE OBJECT BUSINESS DEVICE, MEGA-CONSTELLATION BUSINESS DEVICE, ROCKET LAUNCH ASSIST BUSINESS DEVICE, SPACE SITUATIONAL AWARENESS BUSINESS DEVICE, DEBRIS REMOVAL BUSINESS DEVICE, ROCKET LAUNCH BUSINESS DEVICE, AND OADR

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 618 days.

(21) Appl. No.: 17/912,065

(22) PCT Filed: May 7, 2021

(86) PCT No.: PCT/JP2021/017585
§ 371 (c)(1),
(2) Date: Sep. 16, 2022

(87) PCT Pub. No.: WO2021/230171
PCT Pub. Date: Nov. 18, 2021

(65) Prior Publication Data
US 2023/0143280 A1　　May 11, 2023

(30) Foreign Application Priority Data

May 12, 2020　(JP) ................................. 2020-084116

(51) Int. Cl.
*B64G 1/10* (2006.01)
*B64G 1/24* (2006.01)
*B64G 3/00* (2006.01)

(52) U.S. Cl.
CPC ......... *B64G 1/1085* (2013.01); *B64G 1/2429* (2023.08); *B64G 3/00* (2013.01); *B64G 1/2427* (2023.08)

(58) Field of Classification Search
CPC ...... B64G 1/1085; B64G 3/00; B64G 1/2427; B64G 1/10; B64G 1/2429
See application file for complete search history.

(56) References Cited

U.S. PATENT DOCUMENTS

2004/0024527 A1* 2/2004 Patera ...................... G08G 5/80
342/29
2015/0318916 A1* 11/2015 Gopal .................. B64G 1/1021
455/13.1

(Continued)

FOREIGN PATENT DOCUMENTS

JP　　　2017-114159 A　　6/2017

OTHER PUBLICATIONS

International Search Report and Written Opinion mailed on Jul. 13, 2021, received for PCT Application PCT/JP2021/017585, filed on May 7, 2021, 8 pages including English Translation.

*Primary Examiner* — Wade Miles
*Assistant Examiner* — Mohammed Yousef Abuelhawa
(74) *Attorney, Agent, or Firm* — XSENSUS LLP

(57)　　　　　ABSTRACT
A space traffic management device (100) mounted in a mega-constellation business device (41) specifies one to a plurality of representative satellites from a mega-constellation satellite group flying on orbits having the same nominal orbital altitude, and has quasi-real-time high-accuracy orbital information of the representative satellite and orbital information relative values of constituent satellites other (Continued)

300 : SATELLITE GROUP　　　　20 : SATELLITE CONSTELLATION

70 : EARTH than the representative satellite, relative to the representative satellite. The space traffic management device (100) shares the quasi-real-time high-accuracy orbital information of the representative satellite and the orbital information relative values of the constituent satellites relative to the representative satellite, with the space traffic management devices (100) mounted in a plurality of business devices.

17 Claims, 26 Drawing Sheets

(56) References Cited

U.S. PATENT DOCUMENTS

| | | | |
|---|---|---|---|
| 2016/0264268 A1* | 9/2016 | Aylmer | G21F 5/14 |
| 2018/0346153 A1* | 12/2018 | Kaplan | B64G 1/244 |
| 2018/0370658 A1 | 12/2018 | Amimoto et al. | |
| 2019/0353799 A1* | 11/2019 | Grant | B64G 1/242 |
| 2019/0389602 A1* | 12/2019 | Schilling | B64G 1/26 |
| 2022/0036748 A1* | 2/2022 | Fuselli | G01S 13/933 |

* cited by examiner

Fig. 1

20 : SATELLITE CONSTELLATION

70 : EARTH

300 : SATELLITE GROUP

20 : SATELLITE CONSTELLATION

21 : ORBITAL PLANE

POLAR REGION

300 : SATELLITE GROUP

Fig. 5

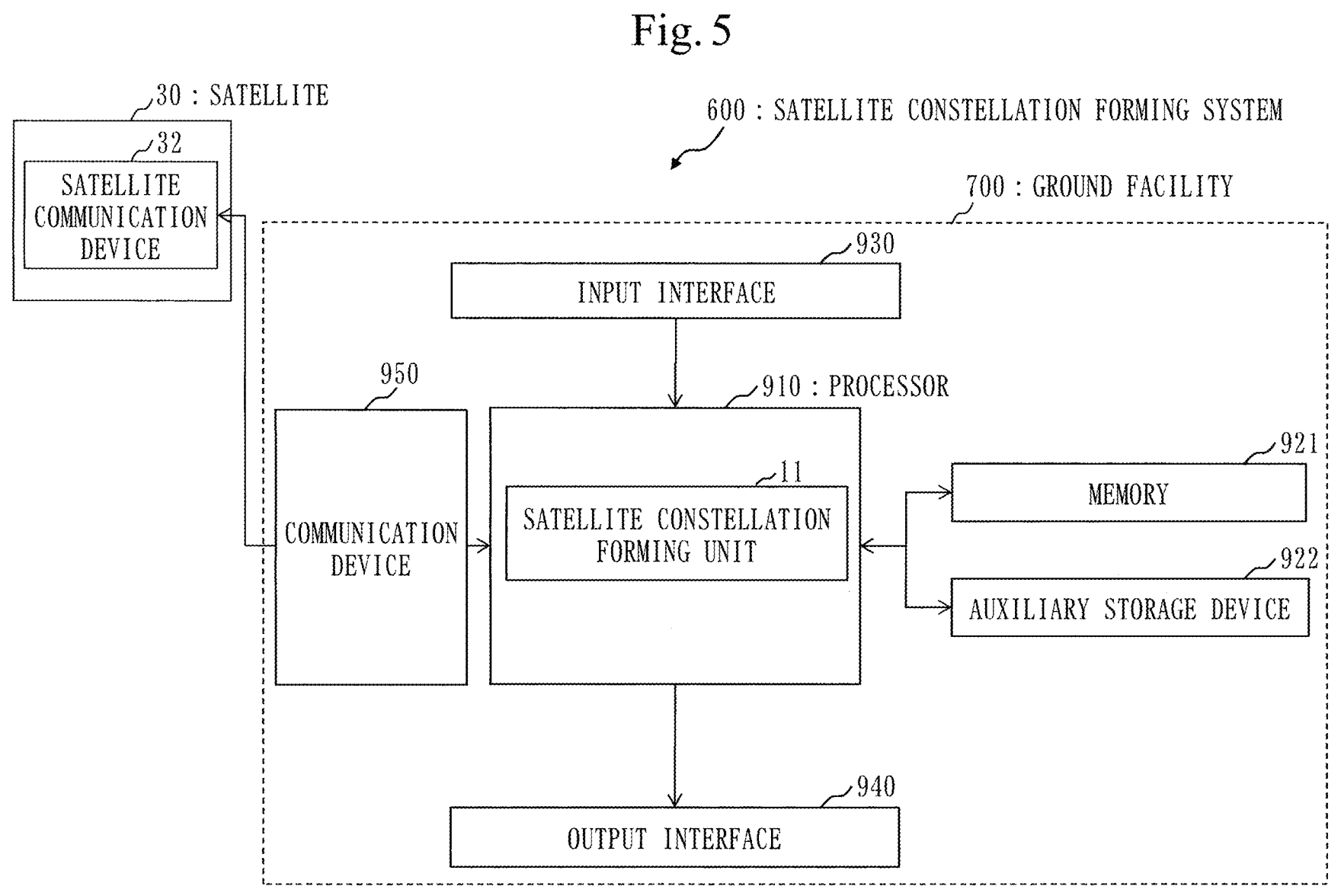

600 : SATELLITE CONSTELLATION FORMING SYSTEM

700 : GROUND FACILITY

921 MEMORY

922 AUXILIARY STORAGE DEVICE

930 INPUT INTERFACE

910 : PROCESSOR

11 SATELLITE CONSTELLATION FORMING UNIT

940 OUTPUT INTERFACE

950 COMMUNICATION DEVICE

30 : SATELLITE

32 SATELLITE COMMUNICATION DEVICE

Figure 8:
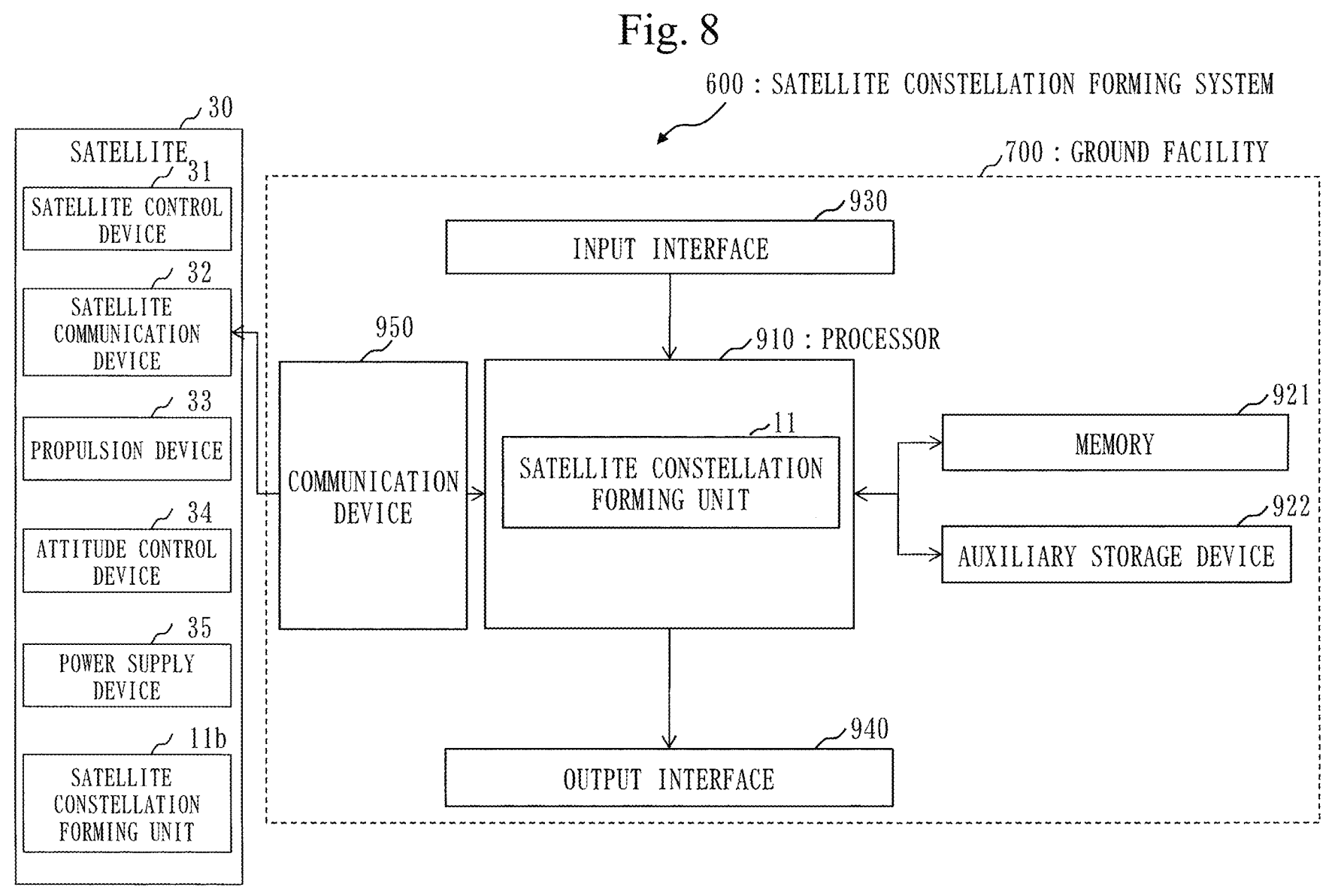

600 : SATELLITE CONSTELLATION FORMING SYSTEM

700 : GROUND FACILITY

910 : PROCESSOR

921 MEMORY

922 AUXILIARY STORAGE DEVICE

930 INPUT INTERFACE

11 SATELLITE CONSTELLATION FORMING UNIT

940 OUTPUT INTERFACE

950 COMMUNICATION DEVICE

30 SATELLITE
31 SATELLITE CONTROL DEVICE
32 SATELLITE COMMUNICATION DEVICE
33 PROPULSION DEVICE
34 ATTITUDE CONTROL DEVICE
35 POWER SUPPLY DEVICE
11b SATELLITE CONSTELLATION FORMING UNIT

Fig.12

51 : ORBIT PREDICTION INFORMATION
511 : SPACE OBJECT ID
512 : PREDICTED EPOCH
513 : PREDICTED ORBITAL ELEMENT
514 : PREDICTED ERROR
331 : REPRESENTATIVE SATELLITE
301 : MEGA-CONSTELLATION SATELLITE GROUP
332 : CONSTITUENT SATELLITES

| Satellite ID | Debris ID | Epoch | | Keplerian 6 Orbital Elements | | | | | Predicted Error | |
| | | Year and Day | Mean Motion — Orbiting per Day | Eccentricity — No Unit | Inclination — deg | Right Ascension of Ascending Node RAAN — deg | Argument of Perigee — deg | Mean Anomaly — deg | Traveling Direction — km | Orthogonal Direction — km |
|---|---|---|---|---|---|---|---|---|---|---|
| A | | a1 | a2 | a3 | a4 | a5 | a6 | a7 | a8 | a9 |
| B | | b1 | b2 | b3 | b4 | b5 | b6 | b7 | b8 | b9 |
| C | | c1 | c2 | c3 | c4 | c5 | c6 | c7 | c8 | c9 |
| D | | d1 | d2 | d3 | d4 | d5 | d6 | d7 | d8 | d9 |
| E | | e1 | e2 | e3 | e4 | e5 | e6 | e7 | e8 | e9 |
| F | | f1 | f2 | f3 | f4 | f5 | f6 | f7 | f8 | f9 |
| | A | α1 | α2 | α3 | α4 | α5 | α6 | α7 | α8 | α9 |
| | B | β1 | β2 | β3 | β4 | β5 | β6 | β7 | β8 | β9 |
| | Γ | γ1 | γ2 | γ3 | γ4 | γ5 | γ6 | γ7 | γ8 | γ9 |
| | Δ | δ1 | δ2 | δ3 | δ4 | δ5 | δ6 | δ7 | δ8 | δ9 |

Fig.13

EXAMPLE OF SPACE INFORMATION RECORDER 101
OF MEGA-CONSTELLATION BUSINESS DEVICE 41

100: SPACE TRAFFIC MANAGEMENT DEVICE

500 : SPACE TRAFFIC MANAGEMENT SYSTEM

REPRESENTATIVE SATELLITE

RELATIVE ELEVATION ANGLE
WITHIN ORBITAL PLANE

REPRESENTATIVE SATELLITE

RELATIVE ELEVATION ANGLE
BETWEEN ORBITAL PLANES

Fig. 20

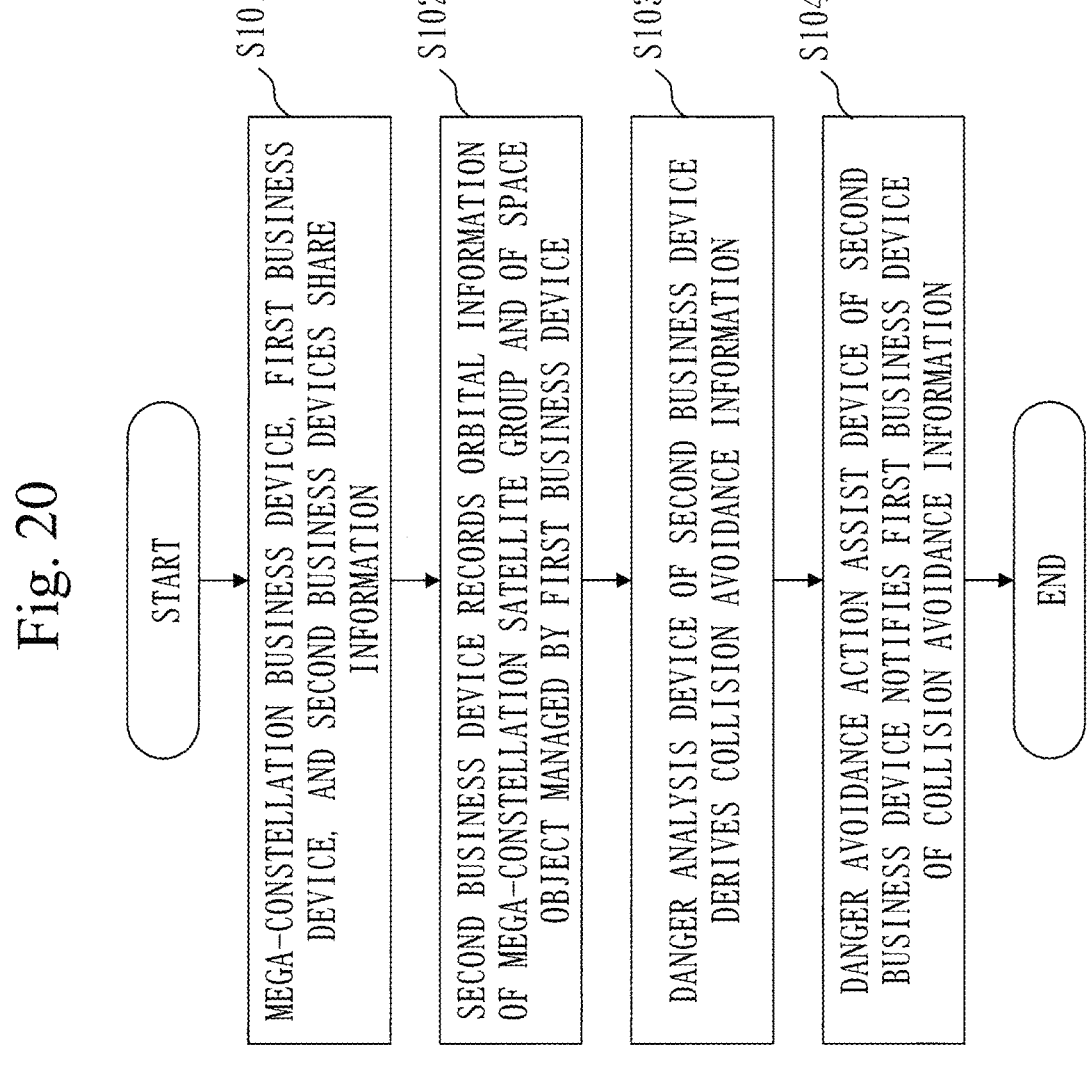

START

S101
MEGA-CONSTELLATION BUSINESS DEVICE, FIRST BUSINESS DEVICE, AND SECOND BUSINESS DEVICES SHARE INFORMATION

S102
SECOND BUSINESS DEVICE RECORDS ORBITAL INFORMATION OF MEGA-CONSTELLATION SATELLITE GROUP AND OF SPACE OBJECT MANAGED BY FIRST BUSINESS DEVICE

S103
DANGER ANALYSIS DEVICE OF SECOND BUSINESS DEVICE DERIVES COLLISION AVOIDANCE INFORMATION

S104
DANGER AVOIDANCE ACTION ASSIST DEVICE OF SECOND BUSINESS DEVICE NOTIFIES FIRST BUSINESS DEVICE OF COLLISION AVOIDANCE INFORMATION

END

Fig. 21

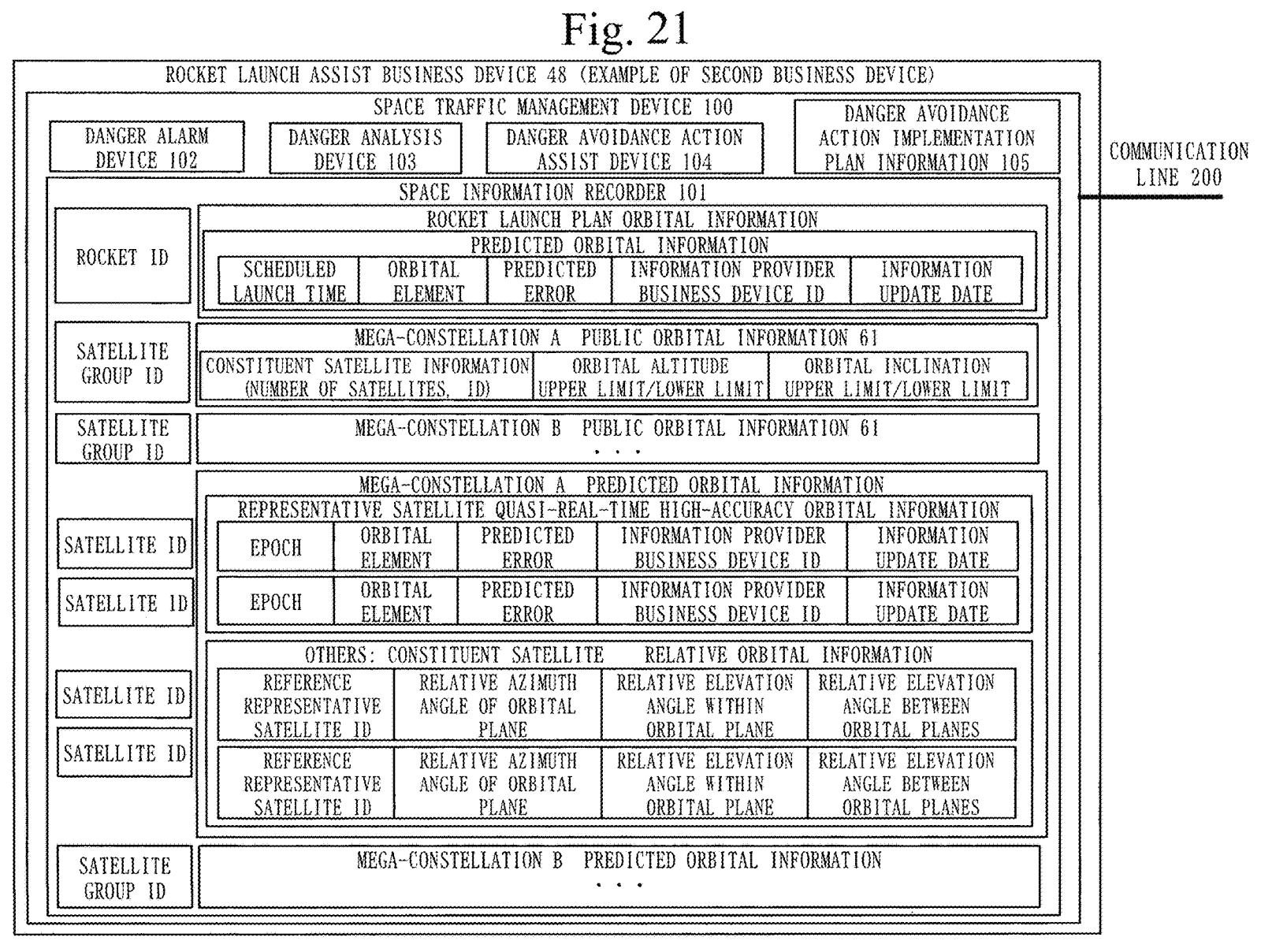

COMMUNICATION LINE 200

ROCKET LAUNCH ASSIST BUSINESS DEVICE 48 (EXAMPLE OF SECOND BUSINESS DEVICE)

SPACE TRAFFIC MANAGEMENT DEVICE 100

| DANGER ALARM DEVICE 102 | DANGER ANALYSIS DEVICE 103 | DANGER AVOIDANCE ACTION ASSIST DEVICE 104 | DANGER AVOIDANCE ACTION IMPLEMENTATION PLAN INFORMATION 105 |

SPACE INFORMATION RECORDER 101

ROCKET LAUNCH PLAN ORBITAL INFORMATION

| ROCKET ID | | PREDICTED ORBITAL INFORMATION | | | |
| | SCHEDULED LAUNCH TIME | ORBITAL ELEMENT | PREDICTED ERROR | INFORMATION PROVIDER BUSINESS DEVICE ID | INFORMATION UPDATE DATE |

MEGA-CONSTELLATION A PUBLIC ORBITAL INFORMATION 61

| SATELLITE GROUP ID | CONSTITUENT SATELLITE INFORMATION (NUMBER OF SATELLITES, ID) | ORBITAL ALTITUDE UPPER LIMIT/LOWER LIMIT | ORBITAL INCLINATION UPPER LIMIT/LOWER LIMIT |

MEGA-CONSTELLATION B PUBLIC ORBITAL INFORMATION 61

| SATELLITE GROUP ID | . . . |

MEGA-CONSTELLATION A PREDICTED ORBITAL INFORMATION

REPRESENTATIVE SATELLITE QUASI-REAL-TIME HIGH-ACCURACY ORBITAL INFORMATION

| SATELLITE ID | ORBITAL ELEMENT | PREDICTED ERROR | INFORMATION PROVIDER BUSINESS DEVICE ID | INFORMATION UPDATE DATE |
| SATELLITE ID | ORBITAL ELEMENT | PREDICTED ERROR | INFORMATION PROVIDER BUSINESS DEVICE ID | INFORMATION UPDATE DATE |

OTHERS: CONSTITUENT SATELLITE RELATIVE ORBITAL INFORMATION

| SATELLITE ID | REFERENCE REPRESENTATIVE SATELLITE ID | EPOCH | RELATIVE AZIMUTH ANGLE OF ORBITAL PLANE | RELATIVE ELEVATION ANGLE WITHIN ORBITAL PLANE | RELATIVE ELEVATION ANGLE BETWEEN ORBITAL PLANES |
| SATELLITE ID | REFERENCE REPRESENTATIVE SATELLITE ID | EPOCH | RELATIVE AZIMUTH ANGLE OF ORBITAL PLANE | RELATIVE ELEVATION ANGLE WITHIN ORBITAL PLANE | RELATIVE ELEVATION ANGLE BETWEEN ORBITAL PLANES |

MEGA-CONSTELLATION B PREDICTED ORBITAL INFORMATION

| SATELLITE GROUP ID | . . . |

Fig. 22

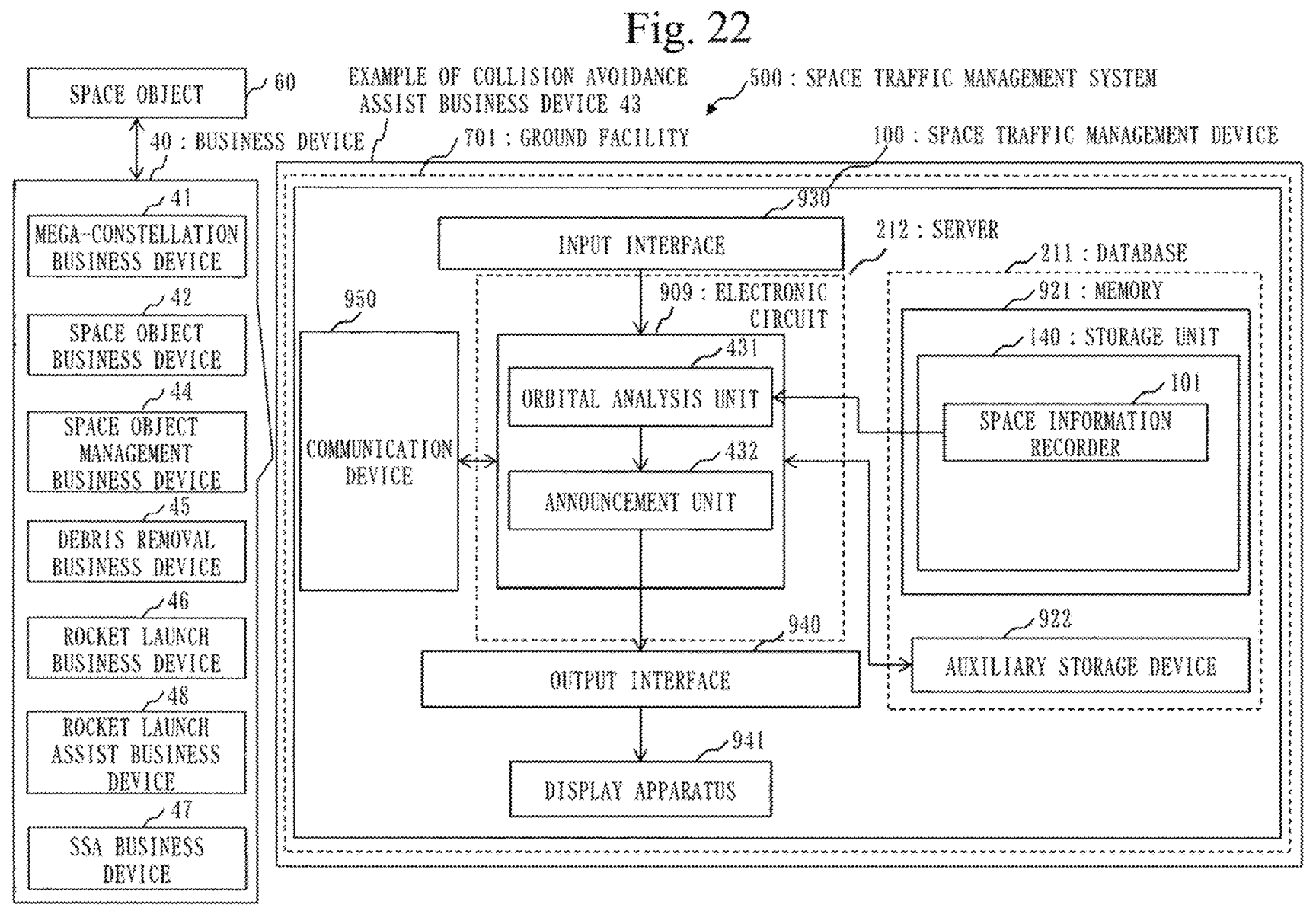

500 : SPACE TRAFFIC MANAGEMENT SYSTEM

EXAMPLE OF COLLISION AVOIDANCE ASSIST BUSINESS DEVICE 43

100 : SPACE TRAFFIC MANAGEMENT DEVICE

701 : GROUND FACILITY

40 : BUSINESS DEVICE

211 : DATABASE

921 : MEMORY

140 : STORAGE UNIT

101

SPACE INFORMATION RECORDER

922

AUXILIARY STORAGE DEVICE

212 : SERVER

930

INPUT INTERFACE

909 : ELECTRONIC CIRCUIT

431

ORBITAL ANALYSIS UNIT

432

ANNOUNCEMENT UNIT

940

OUTPUT INTERFACE

941

DISPLAY APPARATUS

950

COMMUNICATION DEVICE

60

SPACE OBJECT

41

MEGA-CONSTELLATION BUSINESS DEVICE

42

SPACE OBJECT BUSINESS DEVICE

44

SPACE OBJECT MANAGEMENT BUSINESS DEVICE

45

DEBRIS REMOVAL BUSINESS DEVICE

46

ROCKET LAUNCH BUSINESS DEVICE

48

ROCKET LAUNCH ASSIST BUSINESS DEVICE

47

SSA BUSINESS DEVICE

Fig. 26

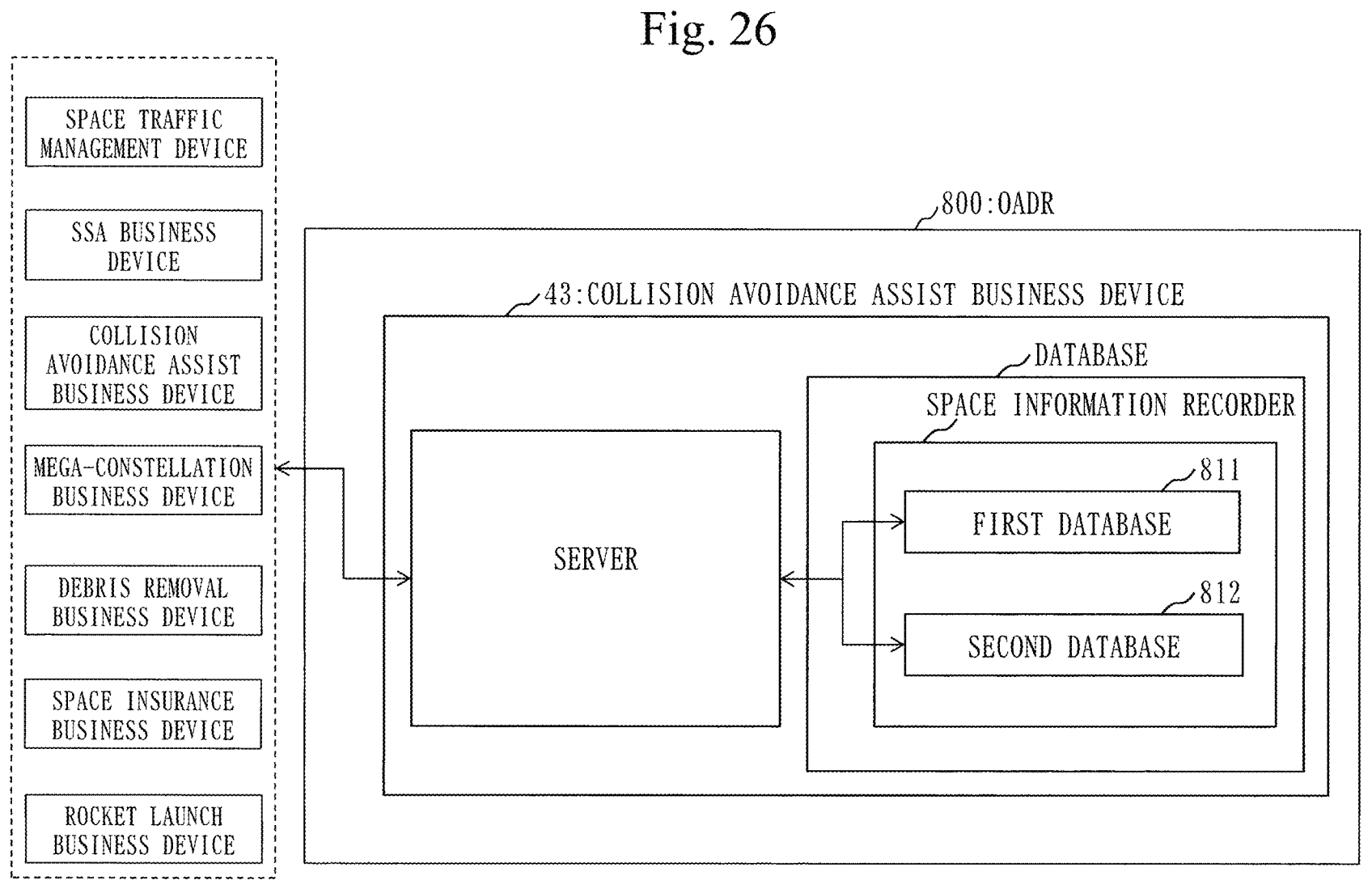

800:OADR

43:COLLISION AVOIDANCE ASSIST BUSINESS DEVICE

DATABASE

SPACE INFORMATION RECORDER

811
FIRST DATABASE

812
SECOND DATABASE

SERVER

SPACE TRAFFIC MANAGEMENT DEVICE

SSA BUSINESS DEVICE

COLLISION AVOIDANCE ASSIST BUSINESS DEVICE

MEGA-CONSTELLATION BUSINESS DEVICE

DEBRIS REMOVAL BUSINESS DEVICE

SPACE INSURANCE BUSINESS DEVICE

ROCKET LAUNCH BUSINESS DEVICE

1

SPACE TRAFFIC MANAGEMENT METHOD, COLLISION AVOIDANCE ASSIST BUSINESS DEVICE, SPACE OBJECT BUSINESS DEVICE, MEGA-CONSTELLATION BUSINESS DEVICE, ROCKET LAUNCH ASSIST BUSINESS DEVICE, SPACE SITUATIONAL AWARENESS BUSINESS DEVICE, DEBRIS REMOVAL BUSINESS DEVICE, ROCKET LAUNCH BUSINESS DEVICE, AND OADR

CROSS-REFERENCE TO RELATED APPLICATIONS

The present application is based on PCT filing PCT/JP2021/017585, filed May 7, 2021, which claims priority to JP 2020-084116, filed May 12, 2020, the entire contents of each are incorporated herein by reference.

TECHNICAL FIELD

The present disclosure relates to a space traffic management system, a space information recorder, a space traffic management device, a space traffic management method, a collision avoidance assist business device, a space object business device, a mega-constellation business device, a rocket launch assist business device, a space situational awareness business device, a debris removal business device, a rocket launch business device, and an OADR.

BACKGROUND ART

In recent years, construction of a large-scale satellite constellation consisting of several hundred to several thousand satellites, or a so-called mega constellation, has started, and a risk of satellite collision on an orbit is increasing. In addition, space debris such as satellites that have become uncontrollable due to failure, and rocket wreckage, are increasing.

With this rapid increase of space objects such as satellites and space debris in outer space, there is an increasing need in space traffic management (STM) to create international rules for avoiding collisions of space objects.

Patent Literature 1 discloses a technique of forming a satellite constellation consisting of a plurality of satellites on the same circular orbit.

Conventionally, a framework exists with which the U.S. Combined Space Operations Center (CSpOC) continuously monitors space objects and issues an alarm when approach of space objects to each other or collision of space objects against each other is anticipated. In response to this alarm, manned space stations and commercial communication satellites carry out avoidance operation when it is determined to be necessary. However, in recent years, projects have been announced in the United States to transfer the framework of issuing alarms to private satellites, to a private business operator, and a new framework has been in need.

CITATION LIST

Patent Literature

Patent Literature 1: JP 2017-114159 A

SUMMARY OF INVENTION

Technical Problem

A framework is not available that allows mega-constellation business operators to avoid collisions with each other so that flight safety is ensured at an unsteady operation stage such as orbit insertion and orbital disposal. Thus, collision avoidance operations might be insufficient in the future.

Patent Literature 1 does not describe a framework that allows mega-constellation business operators to avoid collisions with each other so that flight safety is ensured.

The present disclosure has as its objective to effectively assist avoidance of collision of a space object and an individual satellite of a mega-constellation satellite group with each other.

Solution to Problem

In a space traffic management system according to the present disclosure in which space traffic management devices individually mounted in a mega-constellation business device and in each business device of a plurality of business devices are connected to each other via a communication line, the mega-constellation business device managing a mega-constellation consisting of 100 or more satellites, the space traffic management device mounted in the mega-constellation business device specifies one to a plurality of representative satellites from a mega-constellation satellite group flying on orbits having a same nominal orbital altitude, has quasi-real-time high-accuracy orbital information of the representative satellite and orbital information relative values of constituent satellites other than the representative satellite, relative to the representative satellite, and shares the quasi-real-time high-accuracy orbital information of the representative satellite and the orbital information relative values of the constituent satellites relative to the representative satellite, with the space traffic management devices mounted in the plurality of business devices.

Advantageous Effects of Invention

With a space traffic management system according to the present disclosure, a business device other than a mega-constellation business device can conduct analysis of a danger involving a mega-constellation on its own, and can effectively assist avoidance of a space object and an individual satellite of a mega-constellation satellite group with each other.

BRIEF DESCRIPTION OF DRAWINGS

FIG. 1 presents an example in which a plurality of satellites cooperate with each other to realize a global communication service around the entire Earth.

FIG. 2 presents an example in which a plurality of satellites having the same single orbital plane realize an Earth observation service.

FIG. 4 presents an example of a satellite constellation having a plurality of orbital planes intersecting outside of the polar regions.

FIG. 5 is a configuration diagram of a satellite constellation forming system.

FIG. 7 is a configuration diagram of a ground facility of the satellite constellation forming system.

FIG. 8 presents a function configuration example of the satellite constellation forming system.

FIG. 12 presents an example of orbital prediction information according to Embodiment 1.

FIG. 13 presents an example of a space information recorder of the mega-constellation business device according to Embodiment 1.

FIG. 20 is a flowchart of a space traffic management method according to Embodiment 1.

FIG. 21 presents a detailed configuration example of a rocket launch business device which is an example of a second business device according to Embodiment 1.

FIG. 22 presents a hardware configuration example of a space traffic management device of a collision avoidance assist business device according to a modification of Embodiment 1.

FIG. 26 presents a function configuration example of the OADR according to Embodiment 2.

DESCRIPTION OF EMBODIMENTS

Figure 3:
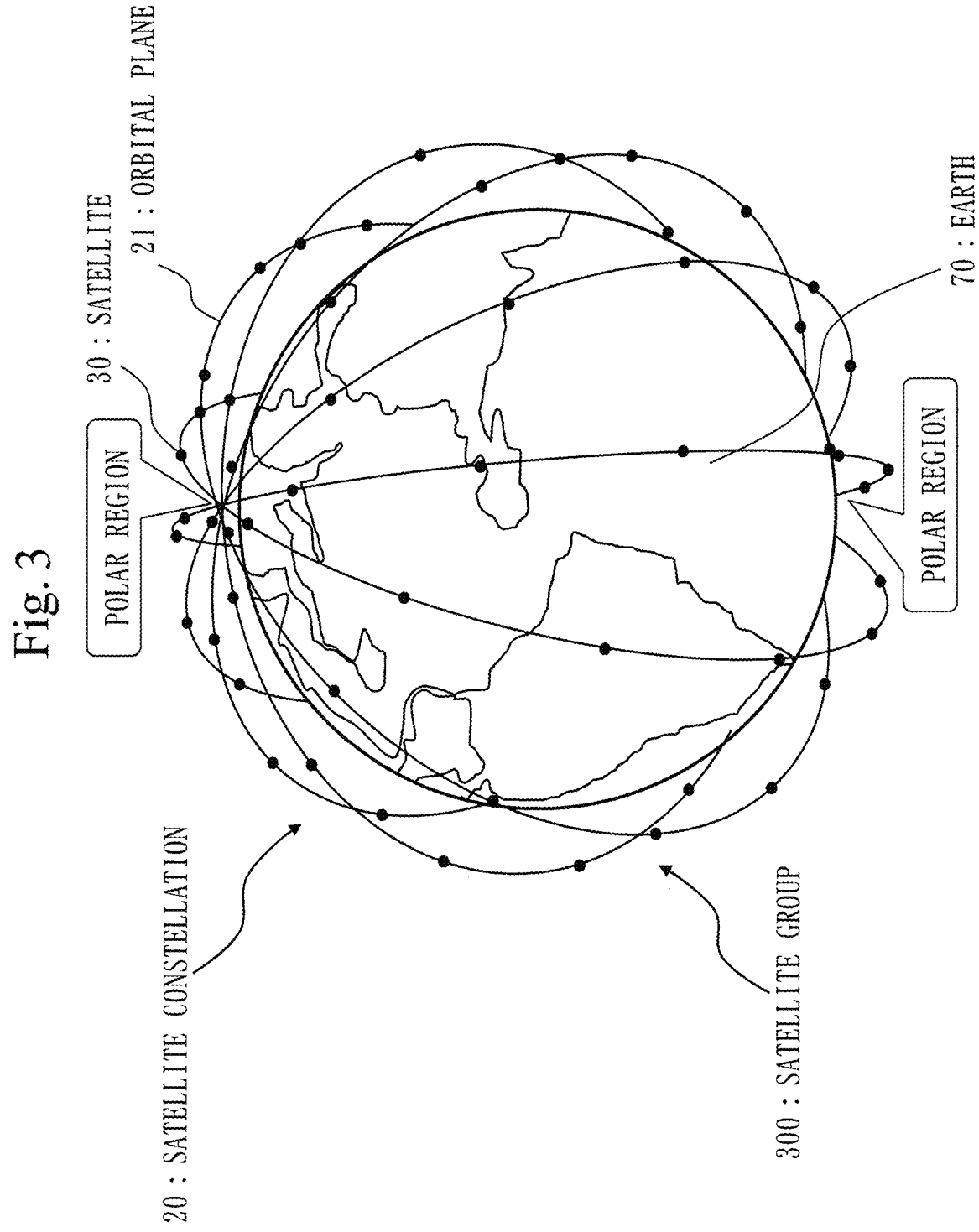
FIG. 3 presents an example of a satellite constellation having a plurality of orbital planes intersecting in vicinities of polar regions.

Embodiments of the present disclosure will now be described below with referring to drawings. In the drawings, the same or equivalent portion is denoted by the same reference sign. In description of the embodiments, where appropriate, the same or equivalent portion will not be described, or will be described only briefly. Further, in the drawings below, a relationship in size among configurations may differ from what it actually is. Further, in description of the embodiments, sometimes a direction or position such as "upper", "lower", "left", "right", "forward", "backward", "front", and "rear" is indicated. These notations are merely given for descriptive convenience and do not limit a layout and orientation of a configuration such as a device, an appliance, and a component.

Embodiment 1

An example of a satellite constellation which is a prerequisite for a space traffic management system according to the embodiment below will be described.

Figure 1:
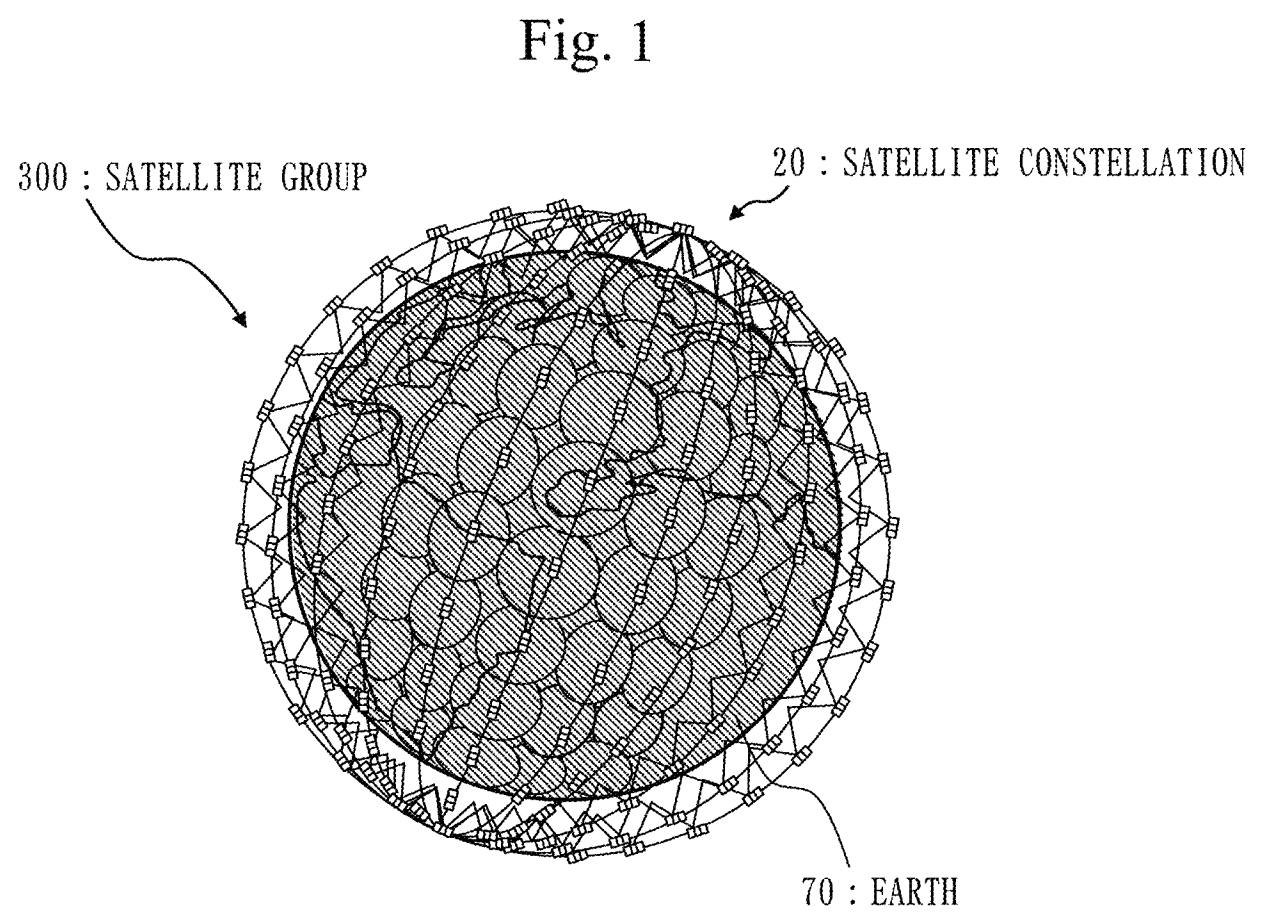

FIG. 1 is a diagram illustrating an example in which a plurality of satellites cooperate with each other to realize a global communication service around an entire Earth 70.

FIG. 1 illustrates a satellite constellation 20 that realizes the communication service around the entire Earth.

Regarding a plurality of satellites flying on the same orbital plane and at the same altitude, a ground communication service range of each satellite overlaps with a communication service range of a following satellite. Hence, with the plurality of such satellites, the plurality of satellites on the same orbital plane can provide a communication service for a particular point on the ground alternately in a time-division manner. If an adjacent orbital plane is formed, the communication service can exhaustively cover the surface of the ground between adjacent orbits. Likewise, if a large number of orbital planes are arranged almost evenly around the Earth, it is possible to provide a global communication service for the ground around the entire Earth.

Figure 2:
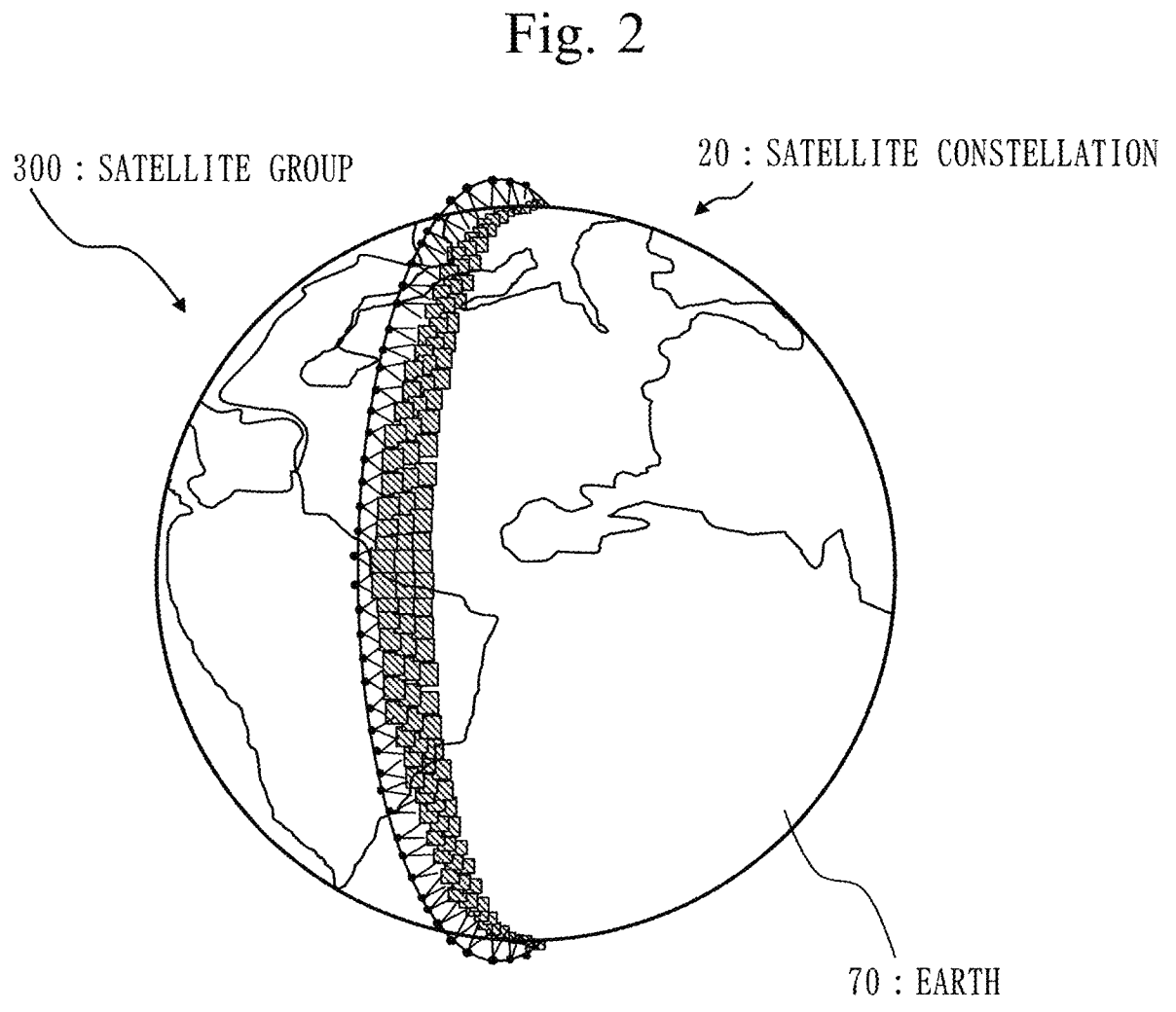

FIG. 2 is a diagram illustrating an example in which a plurality of satellites having the same single orbital plane realize an Earth observation service.

FIG. 2 illustrates a satellite constellation 20 that realizes the Earth observation service. In the satellite constellation 20 of FIG. 2, satellites each equipped with an Earth observation device, which is an optical sensor or a radio wave sensor such as a synthetic aperture radar, fly on the same orbital plane and at the same altitude. In this manner, with a satellite group 300 in which a ground imaging range of a following satellite overlaps a preceding ground imaging range with a time delay, the plurality of satellites on the orbit sense a ground image of a particular point on the ground alternately in a time-division manner, thereby providing the Earth observation service.

In this manner, the satellite constellation 20 is constituted of the satellite group 300 formed of the plurality of satellites having individual orbital planes. In the satellite constellation 20, the service is provided by cooperation of the satellite group 300. The satellite constellation 20 specifically refers to a satellite constellation formed of one satellite group run by a communication business service company as illustrated in FIG. 1, or by an observation business service company as illustrated in FIG. 2.

Figure 4:
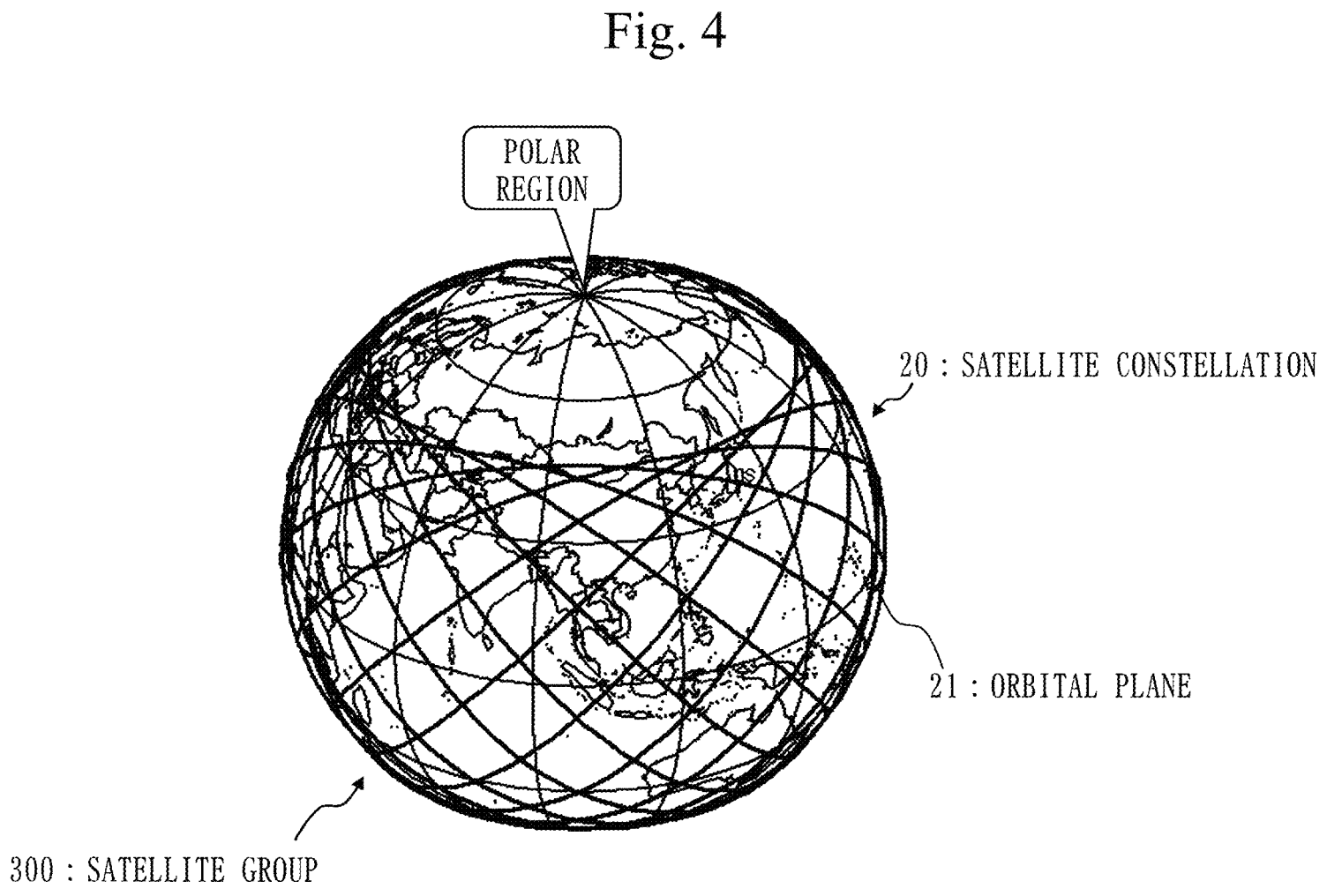

FIG. 3 presents an example of a satellite constellation 20 having a plurality of orbital planes 21 intersecting in vicinities of polar regions. FIG. 4 presents an example of a satellite constellation 20 having a plurality of orbital planes 21 intersecting outside of the polar regions.

In the satellite constellation 20 of FIG. 3, orbital inclinations of the individual orbital planes 21 of the plurality of orbital planes are approximately 90 degrees, and the individual orbital planes 21 of the plurality of orbital planes exist on different planes.

In the satellite constellation 20 of FIG. 4, orbital inclinations of orbital planes 21 of the plurality of orbital planes are not approximately 90 degrees, and the individual orbital planes 21 of the plurality of orbital planes exist on different planes.

In the satellite constellation 20 of FIG. 3, two arbitrary orbital planes intersect at points in the vicinities of polar regions. In the satellite constellation 20 of FIG. 4, two arbitrary orbital planes intersect at points outside of the polar regions. In FIG. 3, there is a possibility that collision of satellites 30 occurs in the vicinities of the polar regions. As illustrated in FIG. 4, intersections of the plurality of orbital planes having orbital inclinations of more than 90 degrees separate from the polar regions according to the orbital inclinations. Also, depending on a combination of the orbital planes, there is a possibility that the orbital planes intersect at various positions including a vicinity of an equator. Accordingly, a location where collision of the satellites 30 can occur varies. The satellites 30 are also called artificial satellites.

Particularly, in recent years, construction of a large-scale satellite constellation consisting of several hundred to several thousand satellites has started, and a risk of satellite collision on the orbit is increasing. In addition, debris such as artificial satellites that have become uncontrollable due to failure. and rocket wreckage, are increasing. The large-scale satellite constellation is also called a mega-constellation. Such debris is also called space debris.

In this manner, as the debris increases in outer space and a number of satellites typically represented by mega-constellations increases rapidly, demands for space traffic management (STM) have arisen.

Also, to realize orbital transfer of a space object, demands have arisen for post-mission disposal (PMD) that takes place after a mission on the orbit is ended, or for ADR according to which debris such as a failed satellite and a floating upper block of a rocket is subjected to orbital disposal by an external means such as a debris removal satellite. International discussion for STM about such ADR demands has begun. PMD stands for Post Mission Disposal. ADR stands for Active Debris Removal. STM stands for Space Traffic Management.

With referring to FIGS. 5 to 8, description will be made on an example of a satellite 30 and a ground facility 700 in a satellite constellation forming system 600 which forms the satellite constellation 20. For example, the satellite constellation forming system 600 is operated by a business operator that runs a satellite constellation business of a mega-constellation business device 41, an LEO constellation business device, a satellite business device, or the like. LEO stands for Low Earth Orbit.

A satellite control scheme using the satellite constellation forming system 600 is also applied to a business device 40 that controls a satellite. For example, this satellite control scheme may be loaded in a business device 40 such as a debris removal business device 45 to manage a debris removal satellite, a rocket launch business device 46 to launch a rocket, and an orbital transfer business device to manage an orbital transfer satellite.

The satellite control scheme using the satellite constellation forming system 600 may be loaded in any business device as far as it is a business device of a business operator that manages a space object 60.

Individual devices of the business devices 40 will be described later.

FIG. 5 is a configuration diagram of the satellite constellation forming system 600.

The satellite constellation forming system 600 is provided with a computer. FIG. 5 illustrates a one-computer configuration. In practice, computers are provided to the individual satellites 30 of the plurality of satellites constituting the satellite constellation 20 and to the ground facility 700 which communicates with the satellites 30. The computers provided to the individual satellites 30 of the plurality of satellites and to the ground facility 700 communicating with the satellites 30 cooperate with each other to implement functions of the satellite constellation forming system 600. In the following, an example of a configuration of a computer that implements the functions of the satellite constellation forming system 600 will be described.

The satellite constellation forming system 600 is provided with the satellites 30 and the ground facility 700. Each satellite 30 is provided with a satellite communication device 32 to communicate with a communication device 950 of the ground facility 700. FIG. 5 illustrates the satellite communication device 32 among configurations provided to the satellite 30.

The satellite constellation forming system 600 is provided with a processor 910 and other hardware devices as well, such as a memory 921, an auxiliary storage device 922, an input interface 930, an output interface 940, and a communication device 950. The processor 910 is connected to the other hardware devices via a signal line and controls the other hardware devices. The hardware of the satellite constellation forming system 600 is the same as hardware of a space traffic management device 100 to be described later with referring to FIG. 9.

The satellite constellation forming system 600 is provided with a satellite constellation forming unit 11 as a function element. A function of the satellite constellation forming unit 11 is implemented by hardware or software.

The satellite constellation forming unit 11 controls formation of the satellite constellation 20 while communicating with the satellites 30.

Figure 6:
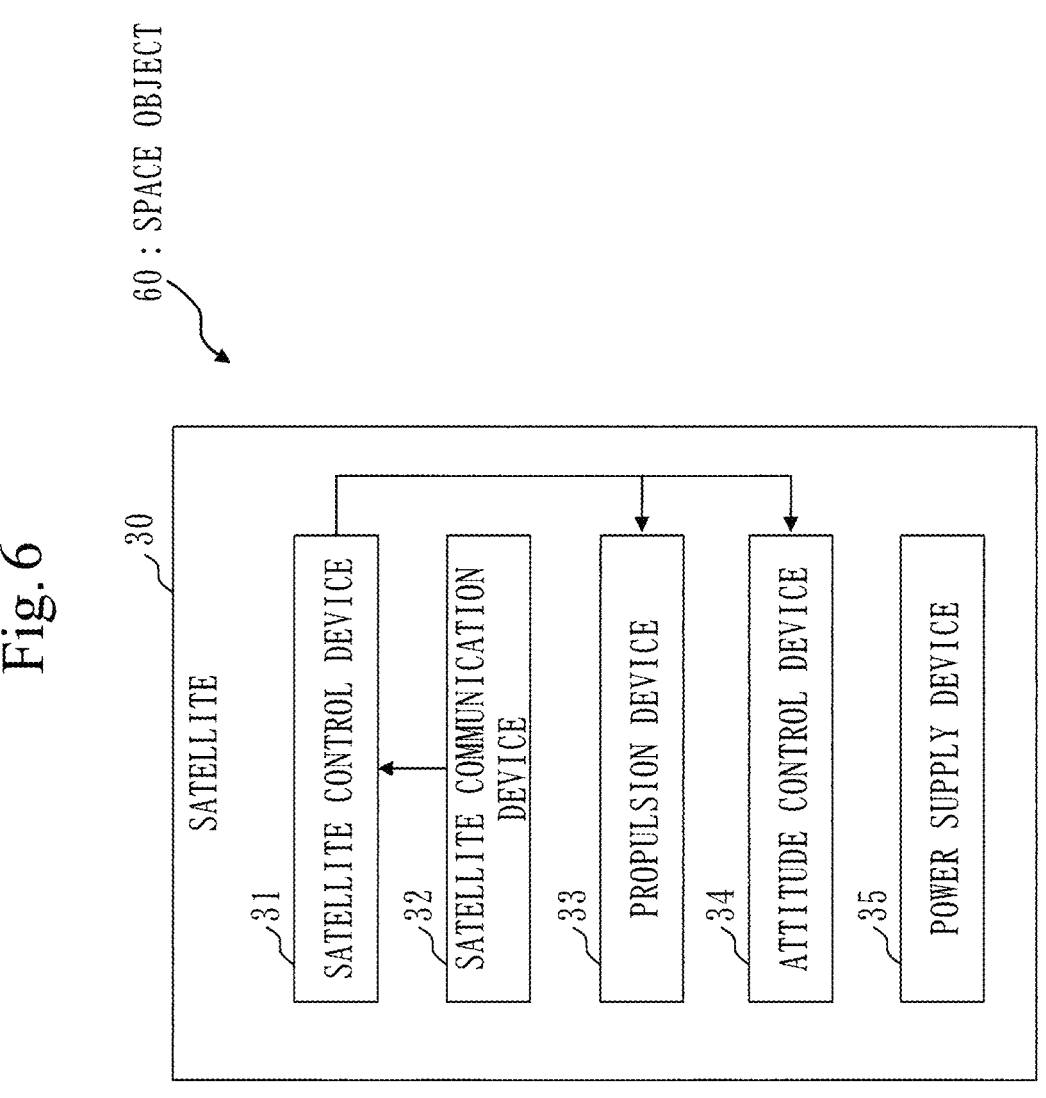
FIG. 6 is a configuration diagram of a satellite of the satellite constellation forming system.

FIG. 6 is a configuration diagram of the satellite 30 of the satellite constellation forming system 600.

The satellite 30 is provided with a satellite control device 31, a satellite communication device 32, a propulsion device 33, an attitude control device 34, and a power supply device 35. The satellite 30 is also provided with other constituent elements that implement various types of functions. With referring to FIG. 6, description will be made on the satellite control device 31, the satellite communication device 32, the propulsion device 33, the attitude control device 34, and the power supply device 35. The satellite 30 is an example of the space object 60.

The satellite control device 31 is a computer that controls the propulsion device 33 and the attitude control device 34, and is provided with a processing circuit. Specifically, the satellite control device 31 controls the propulsion device 33 and the attitude control device 34 in accordance with various types of commands transmitted from the ground facility 700.

The satellite communication device 32 is a device that communicates with the ground facility 700. Specifically, the satellite communication device 32 transmits various types of data concerning its own satellite to the ground facility 700. The satellite communication device 32 receives various types of commands transmitted from the ground facility 700.

The propulsion device 33 is a device to give propulsion to the satellite 30 and changes a speed of the satellite 30. Specifically, the propulsion device 33 is an apogee kick motor, a chemical propulsion device, or an electric propulsion device. The apogee kick motor (AKM) refers to an upper-block propulsion device used for orbit insertion of an artificial satellite, and is also called an apogee motor (when a solid rocket motor is employed) or an apogee engine (when a liquid engine is employed).

The chemical propulsion device is a thruster that uses a one-component or two-component fuel. An example of the electric propulsion device is an ion engine or a Hall thruster. Apogee kick motor is a name of a device used for orbital transfer, and is sometimes a kind of chemical propulsion device.

The attitude control device 34 is a device to control attitude elements such as an attitude of the satellite 30, an angular velocity of the satellite 30, and a Line of Sight. The attitude control device 34 changes the attitude elements into desired directions. Alternatively, the attitude control device 34 maintains the attitude elements in desired directions. The attitude control device 34 is provided with an attitude sensor, an actuator, and a controller. The attitude sensor is a device such as a gyroscope, an Earth sensor, a sun sensor, a star tracker, a thruster, and a magnetic sensor. The actuator is a device such as an attitude control thruster, a momentum wheel, a rection wheel, and a control moment gyro. The controller controls the actuator in accordance with measurement data of the attitude sensor or various types of commands from the ground facility 700.

The power supply device 35 is provided with apparatuses such as a solar cell, a battery, and a power control device, and supplies power to the apparatuses mounted in the satellite 30.

The processing circuit provided to the satellite control device 31 will be described.

The processing circuit may be dedicated hardware, or may be a processor that runs a program stored in the memory.

In the processing circuit, some of its functions may be implemented by dedicated hardware, and its remaining functions may be implemented by software or firmware. That is, the processing circuit can be implemented by hardware, software, or firmware; or a combination of hardware, software, and firmware.

The dedicated hardware is specifically a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

ASIC stands for Application Specific Integrated Circuit. FPGA stands for Field Programmable Gate Array.

Figure 7:
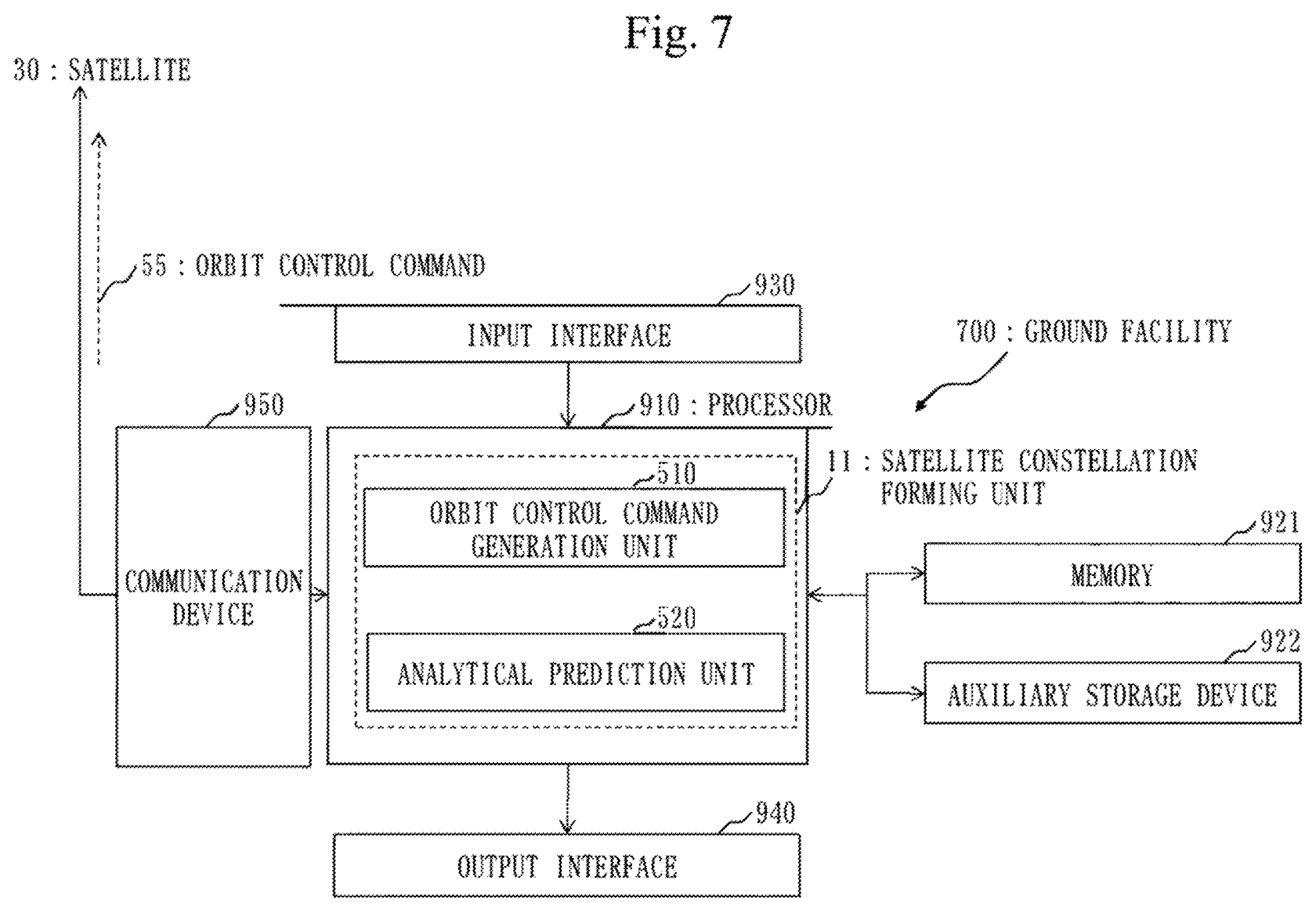

FIG. 7 is a configuration diagram of the ground facility 700 provided to the satellite constellation forming system 600.

The ground facility 700 program-controls a large number of satellites on every orbital plane. The ground facility 700 is an example of a ground device. The ground device is constituted of: a ground station including, for example, a ground antenna device, a communication device connected to the ground antenna device, and an electronic calculator; and a ground facility serving as a server or terminal connected to the ground station via a network. The ground device may include a communication device mounted in a mobile body such as an aircraft, an automotive vehicle, and a mobile terminal.

The ground facility 700 forms the satellite constellation 20 through communication with the satellites 30. The ground facility 700 is provided to the space traffic management device 100. The ground facility 700 is provided with the processor 910 and other hardware devices such as the memory 921, the auxiliary storage device 922, the input interface 930, the output interface 940, and the communication device 950. The processor 910 is connected to the other hardware devices via the signal line and controls the other hardware devices. The hardware of the ground facility 700 is the same as hardware of the space traffic management device 100 to be described later with referring to FIG. 9.

The ground facility 700 is provided with an orbit control command generation unit 510 and an analytical prediction unit 520, as function elements. Functions of the orbit control command generation unit 510 and analytical prediction unit 520 are implemented by hardware or software.

The communication device 950 transmits and receives a signal that performs tracking control of the satellites 30 of the satellite group 300 constituting the satellite constellation 20. Also, the communication device 950 transmits an orbit control command 55 to the satellites 30.

The analytical prediction unit 520 analytically predicts orbits of the satellites 30.

The orbit control command generation unit 510 generates the orbit control command 55 to be transmitted to the satellites 30.

The orbit control command generation unit 510 and the analytical prediction unit 520 implement the function of the satellite constellation forming unit 11. That is, the orbit control command generation unit 510 and the analytical prediction unit 520 are examples of the satellite constellation forming unit 11.

FIG. 8 is a diagram illustrating a function configuration example of the satellite constellation forming system 600.

The satellite 30 is further provided with a satellite constellation forming unit 11b which forms the satellite constellation 20. The satellite constellation forming units 11b of the individual satellites 30 of the plurality of satellites and the satellite constellation forming unit 11 provided to the ground facility 700 cooperate with each other to implement the functions of the satellite constellation forming system 600. Alternatively, the satellite constellation forming unit 11b of the satellite 30 may be provided to the satellite control device 31.

*Description of Configurations*

A space traffic management system 500 according to the present embodiment is provided with a collision avoidance assist business device 43 and a plurality of mega-constellation business devices 41. The collision avoidance assist business device 43 assists avoidance of collision of space objects with each other in outer space. The mega-constellation business devices 41 manage mega-constellations which are satellite constellations each consisting of 100 or more satellites.

The space traffic management device 100 according to the present embodiment is mounted in the collision avoidance assist business device 43 and in each of the plurality of mega-constellation business devices 41, and is provided with a database 211 and a server 212. A space traffic management device 100 may be mounted in a space insurance business device of a space insurance business operator which runs a space insurance business.

In the space traffic management system 500, the space traffic management devices 100 individually mounted in the collision avoidance assist business device 43, the plurality of mega-constellation business devices 41, and the space insurance business device are connected to each other via a communication line.

Figure 9:
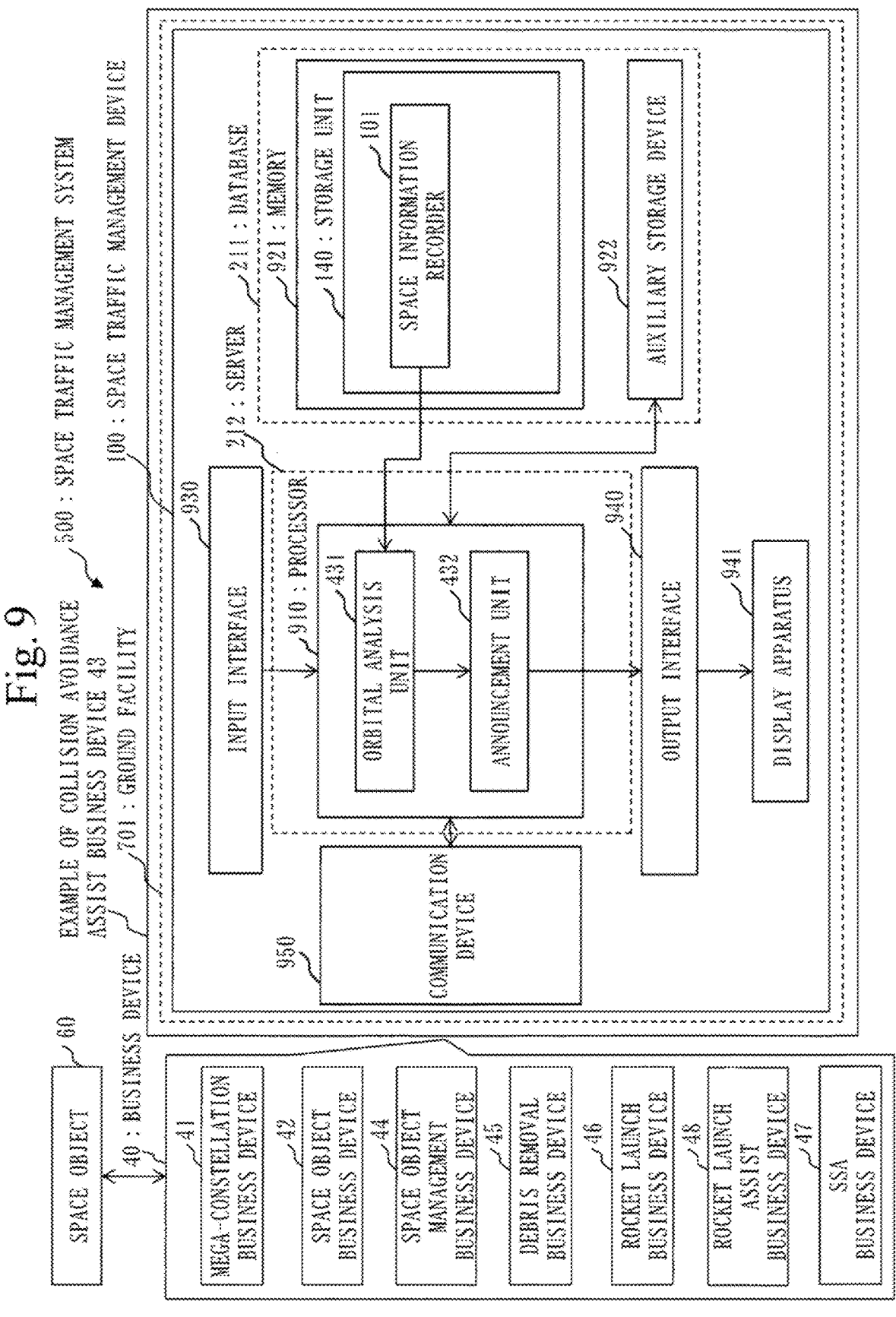
FIG. 9 presents a hardware configuration example of a space traffic management device of a collision avoidance assist business device according to Embodiment 1.

FIG. 9 is a diagram illustrating a hardware configuration example of the space traffic management device 100 of the collision avoidance assist business device 43 according to the present embodiment.

Figure 10:
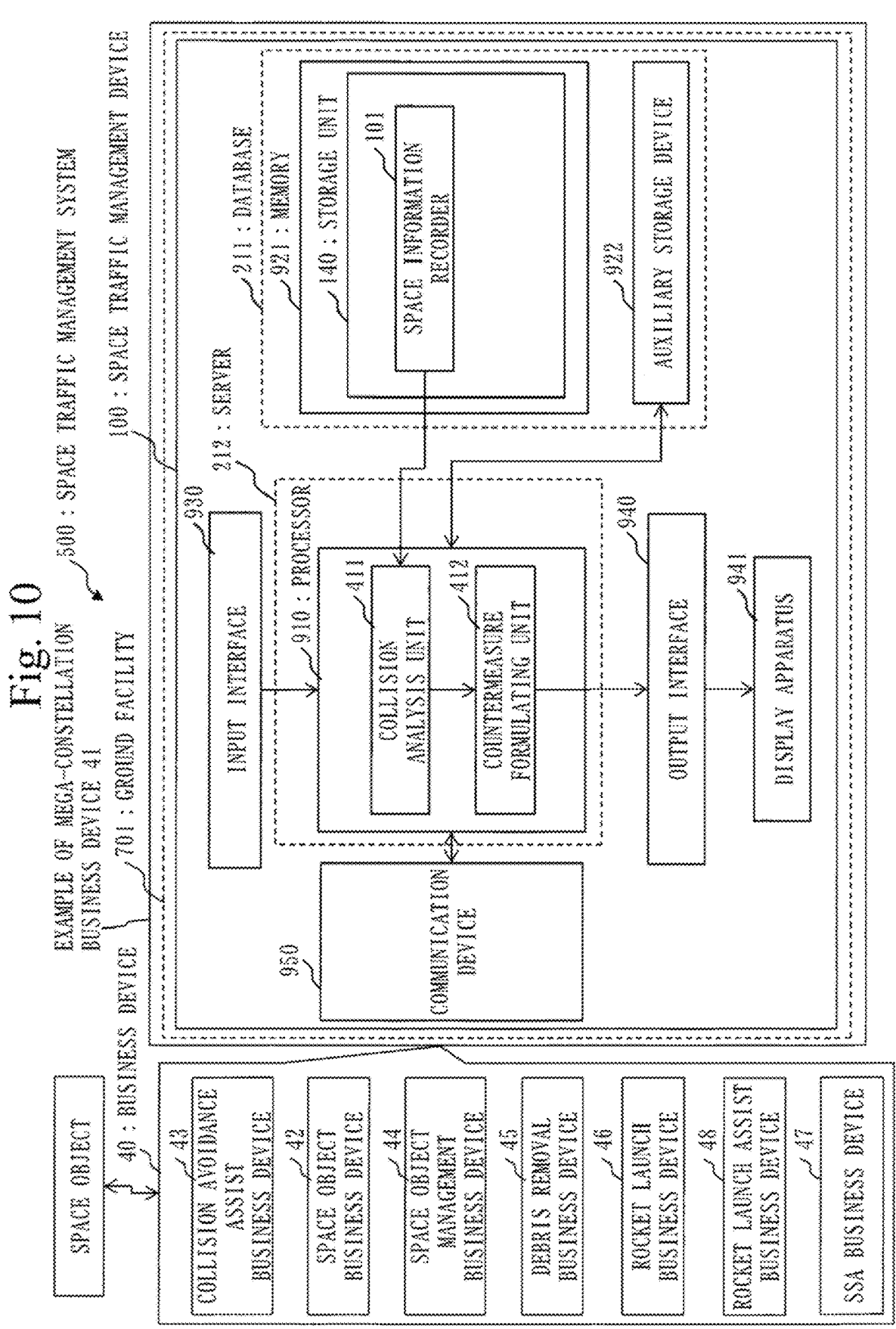
FIG. 10 presents a hardware configuration example of a space traffic management device of a mega-constellation business device according to Embodiment 1.

FIG. 10 is a diagram illustrating a hardware configuration example of the space traffic management device 100 of the mega-constellation business device 41 according to the present embodiment.

In the present embodiment, the space traffic management devices 100 are individually mounted in the mega-constellation business devices 41, a space object business device 42, the collision avoidance assist business device 43, a space object management business device 44, the debris removal business device 45, the rocket launch business device 46, a Space Situational Awareness (SSA) business device 47, and a rocket launch assist business device 48.

The mega-constellation business device 41 manages the satellite constellation consisting of a plurality of satellites. Specifically, the mega-constellation business device 41 is a computer of a mega-constellation business operator which runs a large-scale satellite constellation business, that is, a mega-constellation business. The mega-constellation business device 41 is an example of a satellite constellation business device that manages a satellite constellation consisting of, for example, 100 or more satellites.

The collision avoidance assist business device 43 assists avoidance of collision of space objects with each other in outer space. Specifically, the collision avoidance assist business device 43 is a computer of a collision avoidance assist business operator which assists avoidance of collision of space objects with each other in outer space.

The business devices 40 include the individual business devices described above. Each business device 40 provides information concerning the space object 60 such as an artificial satellite managed by each device, and debris. The business device 40 is a computer of a business operator which collects information concerning the space object 60 such as the artificial satellite and debris.

For example, the LEO constellation business device is a computer of an LEO constellation business operator which runs a low-Earth-orbit constellation business, that is, an LEO constellation business.

The satellite business device is a computer of a satellite business operator which deals with one to several satellites.

The orbital transfer business device is a computer of an orbital transfer business operator which issues a space object intrusion alarm about a satellite.

The debris removal business device 45 is a computer of a debris removal business operator which runs a business of collecting debris.

The rocket launch business device 46 is a computer of a rocket launch business operator which runs a rocket launch business.

The rocket launch assist business device 48 is a computer of the rocket launch business operator which runs the rocket launch business.

The SSA business device is a computer of an SSA business operator which runs an SSA business, that is, a space situational awareness business. The SSA business device is also called a space situational awareness business device.

The space object business device 42 is a business device that manages an unsteady-operation space object.

The space object management business device 44 is a business device that manages a deorbiting space object in an orbital descent process.

A space traffic management device 100 may be mounted in a ground facility 701 provided to each business device 40. A space traffic management device 100 may be mounted in the satellite constellation forming system 600.

The space traffic management device 100 is provided with a processor 910, and is provided with and other hardware devices as well, such as a memory 921, an auxiliary storage device 922, an input interface 930, an output interface 940, and a communication device 950. The processor 910 is connected to the other hardware devices via a signal line and controls the other hardware devices.

The processor 910 is an example of a server. The memory 921 and the auxiliary storage device 922 are examples of the database 211. The server 212 may be provided with other hardware devices such as an input interface 930, an output interface 940, a communication device 950, and a storage apparatus. The server 212 implements individual functions of the mega-constellation business device 41, the space object business device 42, the collision avoidance assist business device 43, the space object management business device 44, the debris removal business device 45, the rocket launch business device 46, the SSA business device 47, and the rocket launch assist business device 48.

As illustrated in FIG. 9, the space traffic management device 100 of the collision avoidance assist business device 43 is provided with an orbital analysis unit 431, an announcement unit 432, and a storage unit 140, as examples of function elements that implement a collision avoidance assist function. A space information recorder 101 is stored in the storage unit 140.

As illustrated in FIG. 10, the space traffic management device 100 of the mega-constellation business device 41 is provided with a collision analysis unit 411, a countermeasure formulating unit 412, and a storage unit 140, as examples of function elements that implement a mega-constellation management function. A space information recorder 101 is stored in the storage unit 140.

In the following, a hardware configuration of the space traffic management device 100 will be described with referring to FIG. 9, using the space traffic management device 100 of the collision avoidance assist business device 43 as an example. Note that the space traffic management device 100 of another business device 40 has the same hardware configuration.

To simplify the description, a configuration having the same function is denoted by the same reference sign. However, each of the mega-constellation business device 41, the collision avoidance assist business device 43, and the space insurance business device individually has a hardware configuration and a function configuration individually.

Functions of the orbital analysis unit 431 and announcement unit 432 are implemented by software. The storage unit 140 is provided to the memory 921. Alternatively, the storage unit 140 may be provided to the auxiliary storage device 922. Also, the storage unit 140 may be provided to the memory 921 and the auxiliary storage device 922 dividedly.

FIG. 9 describes the space traffic management device 100 as a device that implements a function of collision avoidance assistance. However, the space traffic management device 100 has various functions other than the function of collision avoidance assistance.

The processor 910 is a device that runs a space traffic management program. The space traffic management program is a program that implements the functions of various constituent elements of the space traffic management device 100 and space traffic management system 500.

The processor 910 is an Integrated Circuit (IC) that performs computation processing. Specific examples of the processor 910 are a Central Processing Unit (CPU), a Digital Signal Processor (DSP), and a Graphics Processing Unit (GPU).

The memory 921 is a storage device that stores data temporarily. A specific example of the memory 921 is a Static Random-Access Memory (SRAM) or a Dynamic Random-Access Memory (DRAM).

The auxiliary storage device 922 is a storage device that keeps data. A specific example of the auxiliary storage device 922 is an HDD. Alternatively, the auxiliary storage device 922 may be a portable storage medium such as an SD (registered trademark) memory card, a CF, a NAND flash, a flexible disk, an optical disk, a compact disk, a Blu-ray (registered trademark) Disc, and a DVD. HDD stands for Hard Disk Drive. SD (registered trademark) stands for Secure Digital. CF stands for CompactFlash (registered trademark). DVD stands for Digital Versatile Disk.

The input interface 930 is a port to be connected to an input device such as a mouse, a keyboard, and a touch panel. The input interface 930 is specifically a Universal Serial Bus (USB) terminal. Alternatively, the input interface 930 may be a port to be connected to a Local Area Network (LAN).

The output interface 940 is a port to which a cable of a display apparatus 941 such as a display is to be connected. The output interface 940 is specifically a USB terminal or a High-Definition Multimedia Interface (HDMI, registered trademark) terminal. The display is specifically a Liquid Crystal Display (LCD).

The communication device 950 has a receiver and a transmitter. The communication device 950 is specifically a communication chip or a Network Interface Card (NIC). In the present embodiment, the space traffic management devices 100 of the mega-constellation business devices 41, space insurance business device, and collision avoidance assist business device 43 communicate with each other via the communication line.

The space traffic management program is read by the processor 910 and run by the processor 910. Not only the space traffic management program but also an Operating System (OS) is stored in the memory 921. The processor 910 runs the space traffic management program while running the OS. The space traffic management program and the OS may be stored in the auxiliary storage device 922. The space traffic management program and the OS which are stored in the auxiliary storage device 922 are loaded into the memory 921 and run by the processor 910. Part or a whole of the space traffic management program may be built in the OS.

The space traffic management device 100 may be provided with a plurality of processors that substitute for the processor 910. The plurality of processors share running of the program. Each processor is a device that runs the program, just as the processor 910 does.

Data, information, signal values, and variable values which are used, processed, or outputted by the program are stored in the memory 921, the auxiliary storage device 922, or a register or cache memory in the processor 910.

The term "unit" in each unit of the space traffic management device may be replaced by "process", "procedure", "means", "phase", or "stage". The term "process" in an orbital analysis process and in an alarming process may be replaced by "program", "program product", or "computer-readable recording medium recorded with a program". The terms "process", "procedure", "means", "phase", and "stage" are replaceable with one another.

The space traffic management program causes the computer to execute processes, procedures, means, phases, or stages corresponding to the individual units in the space traffic management system, with the "units" being replaced by "processes", "procedures", "means", "phases", or "stages". A space traffic management method is a method that is carried out by the space traffic management device 100 running the space traffic management program.

The space traffic management program may be provided as being stored in a computer-readable recording medium. Each program may be provided in the form of a program product.

*Description of Function*

<Representative Satellite (Star Mark Satellite) According to Present Embodiment>

Figure 11:
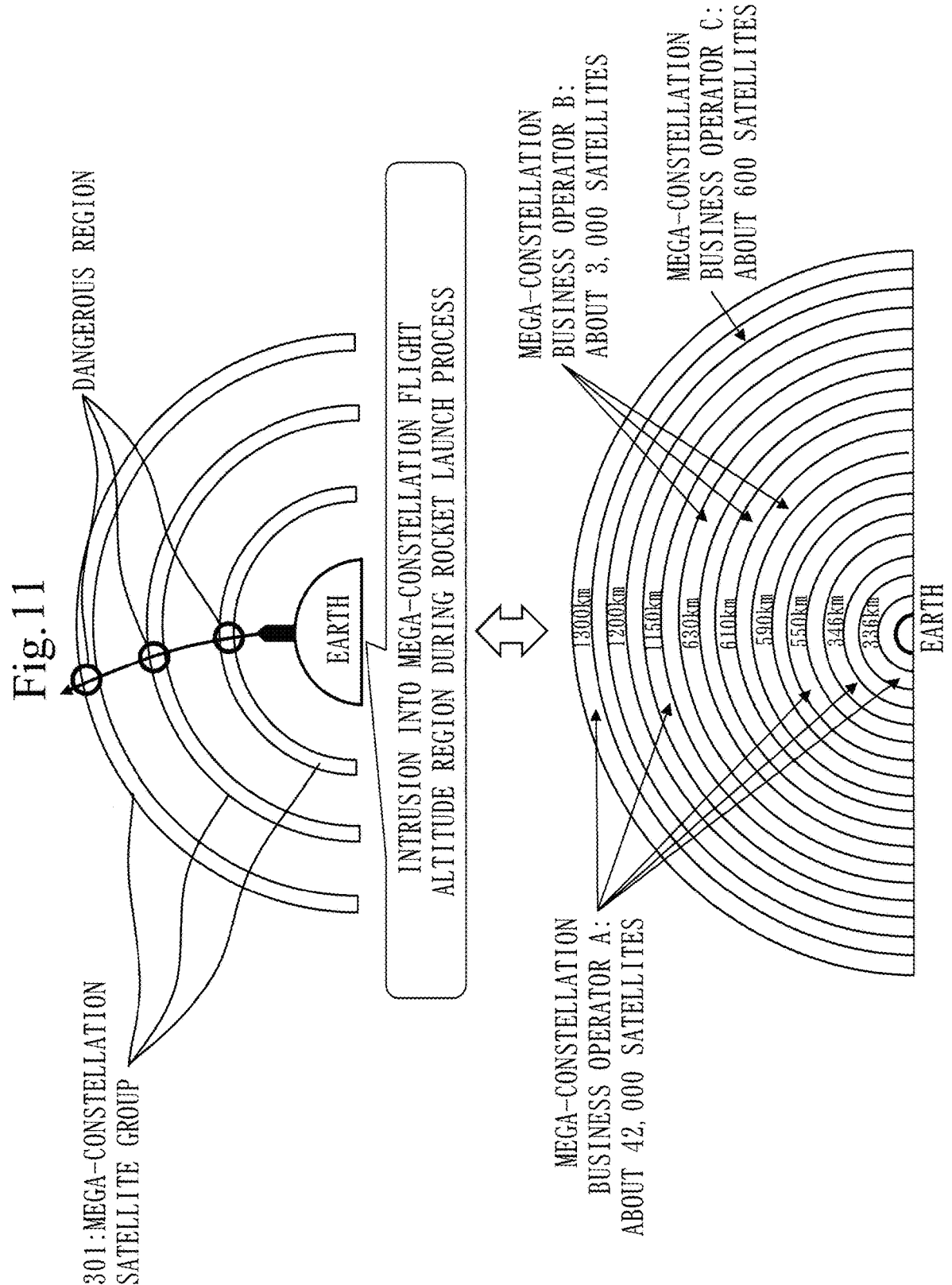
FIG. 11 presents a diagram illustrating status quo of mega-constellation satellite groups and danger regions during rocket launch.

FIG. 11 presents a diagram illustrating status quo of mega-constellation satellite groups and danger regions during rocket launch.

A function outline of the rocket launch assist business device 48 according to the present embodiment will be described with referring to FIG. 11.

A plurality of mega-constellation business operators advocate a project of deploying many, several hundred to several ten-thousand satellites as if to exhaustively cover the sky. At the present stage, a mega-constellation business operator A has already announced a deployment project involving about 42,000 satellites, a mega-constellation business operator B has announced a deployment project involving about 3,000 satellites, and a mega-constellation business operator C has announced a deployment project involving about 600 satellites.

When launching a rocket to an altitude of 1,000 km or more, the rocket must pass through altitude regions where satellite groups of a large number of mega-constellation business operators fly. Then, an optimum launch timing with which no collision occurs in all the altitude regions must be found out.

For example, in order to launch a rocket to an altitude of 1,300 km or more, the rocket must clear all of a plurality of altitude regions where about 50,000 satellites fly. In order to clear all of the plurality of altitude regions where about 50,000 satellites fly, orbital information of the satellite groups of the individual mega-constellation business operators must be grasped accurately.

In a mega-constellation satellite group, when a satellite group consisting of up to several thousand satellites flies on the same orbit, if the orbit is a polar orbit having an orbital inclination of almost 90° as illustrated in FIG. 3, a satellite density is high in polar regions where all orbital planes meet. Therefore, in the polar regions, strict passing timing control must be performed for ensuring flight safety.

Meanwhile, if the orbit is an inclined orbit having an orbital inclination far from 90° as illustrated in FIG. 4, a collision risk exists at an orbital-plane intersection in a middle-latitude region. Therefore, to ensure flight safety by shifting a satellite passing timing at every lattice intersection, strict passing timing control must be performed.

In order to realize such strict passing timing control, the individual satellite groups fly while constantly operating the propulsion devices.

A procedure of ensuring flight safety requires performing danger analysis first of all, such as approach analysis and collision analysis. To perform high-accuracy danger analysis, high-accuracy orbital information of a space object is indispensable.

As described above, however, in mega-constellation satellite groups, the individual satellite groups fly while constantly operating the propulsion devices, in order to realize strict passing timing control. Hence, accurate position information cannot be grasped unless the orbital information is updated in each satellite group in a real-time manner. It is therefore rational to consider that only the mega-constellation business operators which manage individual mega-constellation satellite groups can manage real-time high-accuracy orbital information of several hundred to several ten-thousand satellites.

When performing rocket launch in this situation, it is difficult for the rocket launch business operator to collect every piece of real-time high-accuracy orbital information of about 50,000 satellites possessed by the plurality of mega-constellation business operators, and to perform danger analysis.

On the contrary, it is easy to collect high-accuracy orbital information of about one to ten representative satellites of each mega-constellation. High-accuracy orbital information of a total of no more than about 100 satellites of a plurality of mega-constellation business operators can be shared among the mega-constellation business operators. It is possible to collect quasi-real-time, if not real-time, high-accuracy orbital information of about 100 satellites by updating the information at a high frequency.

The large number of satellite groups flying on the same altitude are under strict passing timing control, as described above. If real-time high-accuracy orbital information of the representative satellite can be grasped, high-accuracy information can be shared by performing relative value management of orbital information of the other satellites.

In view of this, after an epoch and high-accuracy orbital elements of the representative satellite are information-updated at a high frequency, the mega-constellation business operator discloses phase differences within orbital planes of the other satellites with respect to the representative satellite, and relative angles of the orbital planes, to the public, as relative values relative to the representative satellite. Because of this information, even if the representative satellite operates its propulsion device and the orbital information changes accordingly, the relative values of the other satellites as a result of strict timing control for collision prevention in an own system are maintained. As a result, quasi-real-time high-accuracy orbital information can be grasped about all the satellites of the mega-constellation satellite group.

Many mega-constellation business operators are, so to speak, in the same boat. For each mega-constellation business operator, if another mega-constellation business operator exists both at a higher altitude than its own system and at a lower altitude than its own system, a contradictory situation occurs.

In the example of FIG. 11, for each of the mega-constellation business operators A, B, and C, a satellite group of another business operator exists at a higher altitude than its own satellite group, and a satellite group of another business operator exists at a lower altitude than its own satellite group. Hence, in launching a rocket of its own system, the rocket will pass through a flight altitude region of another mega-constellation satellite group. Therefore, a framework of disclosing quasi-real-time high-accuracy orbital information of its own satellite, in launch of another mega-constellation satellite, when this another mega-constellation satellite passes through the flight region of its own satellite group, applies each mega-constellation business operator. It would be impossible to refuse this framework.

Therefore, which is the offender and which is the casualty cannot be one-sidedly determined with respect to a responsibility for avoiding collision in launching a rocket and with respect to an accountability for an accident when collision should occur. The positions of the business operator A, the business operator B, and the business operator C can be reversed anytime. Hence, without a framework where a plurality of mega-constellation business operators can coexist and prosper together, it is difficult to guarantee sustainability of mega-constellation businesses.

FIG. 12 is a diagram illustrating an example of orbit prediction information 51 according to the present embodiment.

For example, a business device 40 stores, to a storage unit, orbit prediction information 51 in which prediction values of an orbit of a space object 60 are set. For example, the business device 40 may acquire prediction values of orbits of a plurality of space objects 60 from another business device 40 utilized by a management business operator which manages the plurality of space objects 60, and may store the acquired prediction values as orbit prediction information 51. Alternatively, the business device 40 may acquire, from the management business operator, orbit prediction information 51 in which prediction values of orbits of a plurality of space objects 60 are set, and may store the acquired orbit prediction information 51 to the storage unit.

The management business operator is a business operator that manages the space object 60 such as a satellite constellation, various types of satellites, a rocket, and debris, which fly in space.

Information such as a space object Identifier (ID) 511, a predicted epoch 512, predicted orbital elements 513, and predicted errors 514 are set in the orbit prediction information 51.

The space object ID 511 is an identifier that identifies the space object 60. In FIG. 11, a satellite ID and a debris ID are set as the space object ID 511. The space object is specifically an object such as a rocket to be launched to outer space, an artificial satellite, a space base, a debris collection satellite, a planetary space probe, and a satellite or rocket that turned into debris after a mission is completed.

The predicted epoch 512 is an epoch predicted for an orbit of each of the plurality of space objects.

The predicted orbital elements 513 are orbital elements that identify an orbit of each of the plurality of space objects. The predicted orbital elements 513 are orbital elements predicted for the orbit of each of the plurality of space objects. In FIG. 12, Keplerian six orbital elements are set as the predicted orbital elements 513.

The predicted errors 514 are errors predicted for the orbit of each of the plurality of space objects. A traveling-direction error and an orthogonal-direction error are set in the predicted errors 514. Error amounts involved in performance values are explicitly indicated in the predicted errors 514.

In the orbit prediction information 51 according to the present embodiment, the predicted epoch 512 and the predicted orbital elements 513 are set concerning the space object 60. A time and position coordinates of the space object 60 in the near future can be obtained from the predicted epoch 512 and the predicted orbital elements 513. For example, the time and position coordinates of the space object 60 in the near future may be set in the orbit prediction information 51.

In this manner, the orbit prediction information 51 is provided with orbital information of the space object, including the epoch and the orbital elements or the time and the position coordinates, to explicitly indicate predicted values of the space object 60 in the near future. The orbit prediction information 51 may have a configuration other than the configuration of FIG. 12 as far as it is information explicitly indicating the predicted values of the space object 60 in the near future.

Also, regarding the predicted values of rocket orbital information included in the space object information of the rocket, the predicted values of the rocket in the near future are explicitly indicated by the same configuration as that of the orbit prediction information 51.

In FIG. 12, assume that satellites A, B, . . . , and F having satellite IDs of A, B, . . . , and F are satellites of a mega-constellation satellite group 301.

A representative satellite 331 is at least one satellite selected from the mega-constellation satellite group 301 which flies at the same orbital altitude. In FIG. 12, assume that the satellite A is the representative satellite 331.

Constituent satellites 332 are satellites other than the representative satellite 331 in the mega-constellation satellite group 301. Hence, in FIG. 12, the satellites B, . . . , and F are the constituent satellites 332.

In the present embodiment, the orbit prediction information 51 of the mega-constellation satellite group 301 is formed of the predicted values of the orbit of the representative satellite 331 and the predicted values of the orbits of the constituent satellites 332 other than the representative satellite 331. The predicted values of the orbit of the representative satellite 331 are real-time high-accuracy orbital information. The predicted values of the orbits of the constituent satellites 332 other than the representative satellite 331 are relative values relative to the predicted values of the orbit of the representative satellite 331. The predicted values of the orbits of the constituent satellites 332 are relative values relative to the predicted value of the orbit of the representative satellite 331, and are referred to as quasi-real-time high-accuracy orbital information as well.

In FIG. 12, the orbit prediction information 51 of the satellites B, . . . , and F other than the satellite A which is the representative satellite 331 are expressed as relative values relative to the orbit prediction information of the representative satellite 331.

Figure 13:
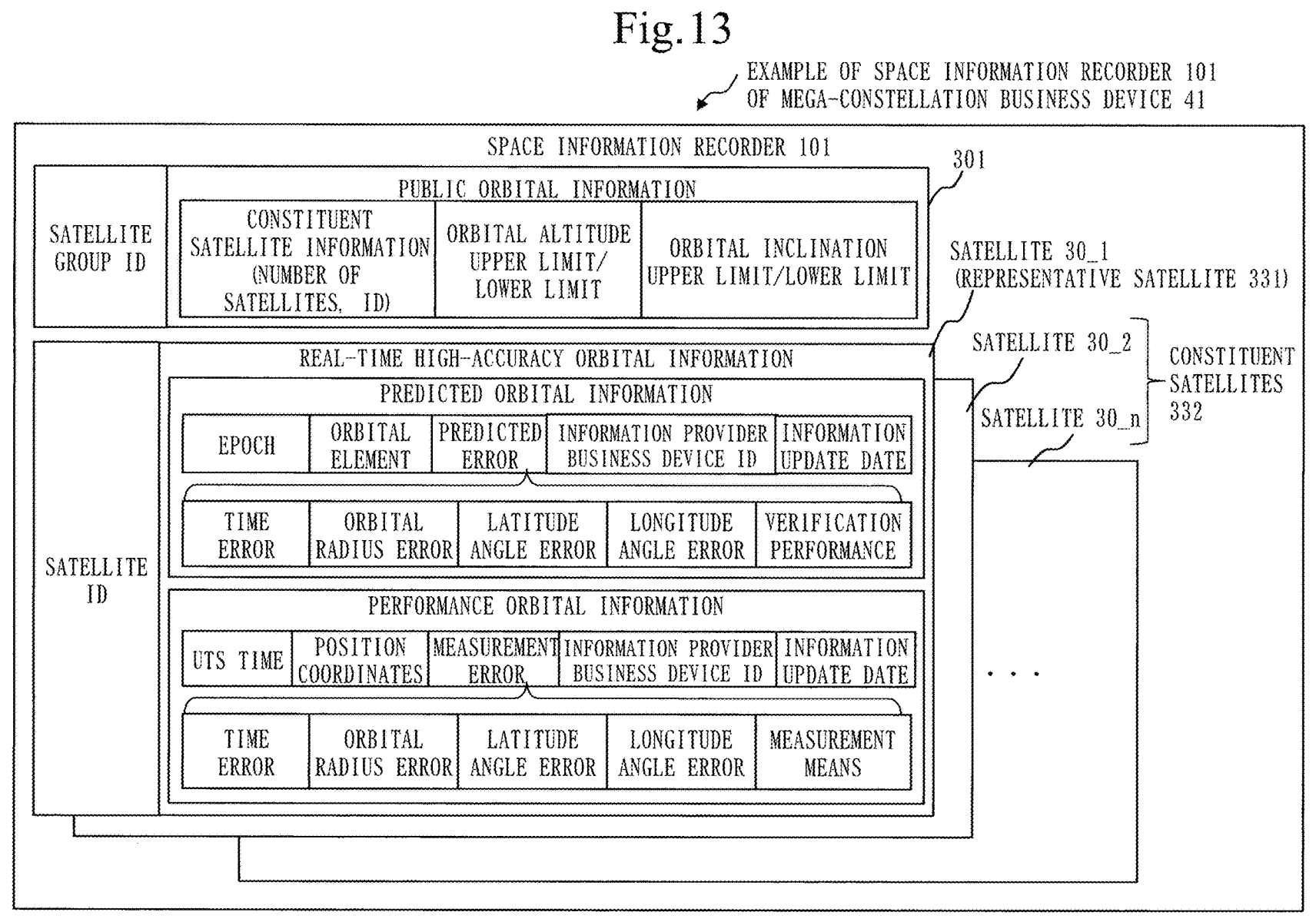

FIG. 13 is a diagram illustrating an example of the space information recorder 101 of the mega-constellation business device 41 according to the present embodiment.

The space information recorder 101 of the mega-constellation business device 41 records orbital information of satellites constituting a mega-constellation. The orbital information includes predicted orbital information and performance orbital information. A specific example of the predicted orbital information of the space information recorder 101 has the same configuration as that of the orbit prediction information 51 of FIG. 12.

The space information recorder 101 is provided with public orbital information associated with a satellite group ID that identifies the mega-constellation satellite group 301, and real-time high-accuracy orbital information associated with a satellite ID that identifies an individual satellite included in the satellite group.

The public orbital information is orbital information that can be disclosed to the other business devices. Constituent satellite information such as a number of satellites constituting the satellite group and satellite IDs of the satellites, an upper limit and lower limit of an orbital altitude of the satellite group, and an upper limit and lower limit of an orbital inclination of the satellite group are set in the public orbital information.

The predicted orbital information and the performance orbital information are set in the real-time high-accuracy orbital information to be associated with the satellite ID. The predicted orbital information and the performance orbital information are set in a real-time manner and accurately.

In the present embodiment, the orbit prediction information 51 of the mega-constellation satellite group 301 is formed of the predicted values of the orbit of the representative satellite 331 and the predicted values of the orbits of the constituent satellites 332 other than the representative satellite 331. The predicted values of the orbits of the constituent satellites 332 other than the representative satellite 331 are relative values relative to the predicted values of the orbit of the representative satellite 331.

The representative satellite 331 is at least one satellite selected from the mega-constellation satellite group 301 which flies at the same orbital altitude.

The constituent satellites 332 are satellites other than the representative satellite 331 in the mega-constellation satellite group 301.

In FIG. 13, as an example, a satellite 30_1 is treated as the representative satellite 331. The constituent satellites 332 other than the satellite 30_1 are a satellite 30_2, . . . , and a satellite 30_n. Note that n is a natural number expressing a number of satellites constituting the mega-constellation satellite group 301.

At this time, the predicted orbital information of the satellite 30_2, . . . , and the satellite 30_n other than the representative satellite 331 may be expressed as relative values relative to the predicted orbital information of the representative satellite 331.

As described above, with the space traffic management device 100 according to the present embodiment, if real-time high-accuracy orbital information of the representative satellite 331 can be grasped, relative value management of orbital information of the other satellites can be performed, so that an effect of sharing high-accuracy information sharing can be achieved.

Also, with the space traffic management device 100 according to the present embodiment, a single business operator can grasp quasi-real-time high-accuracy orbital information about all the satellites managed by a plurality of the mega-constellation business operators. Hence, the space traffic management device according to the present embodiment provides an effect of ensuring flight safety.

*Description of Operations*

<Function of Space Traffic Management System 500>

Function configuration examples of the space traffic management system 500 according to the present embodiment will be described with referring to FIGS. 14 to 17. Hardware configurations of the individual space traffic management devices 100 have been described above.

Figure 14:
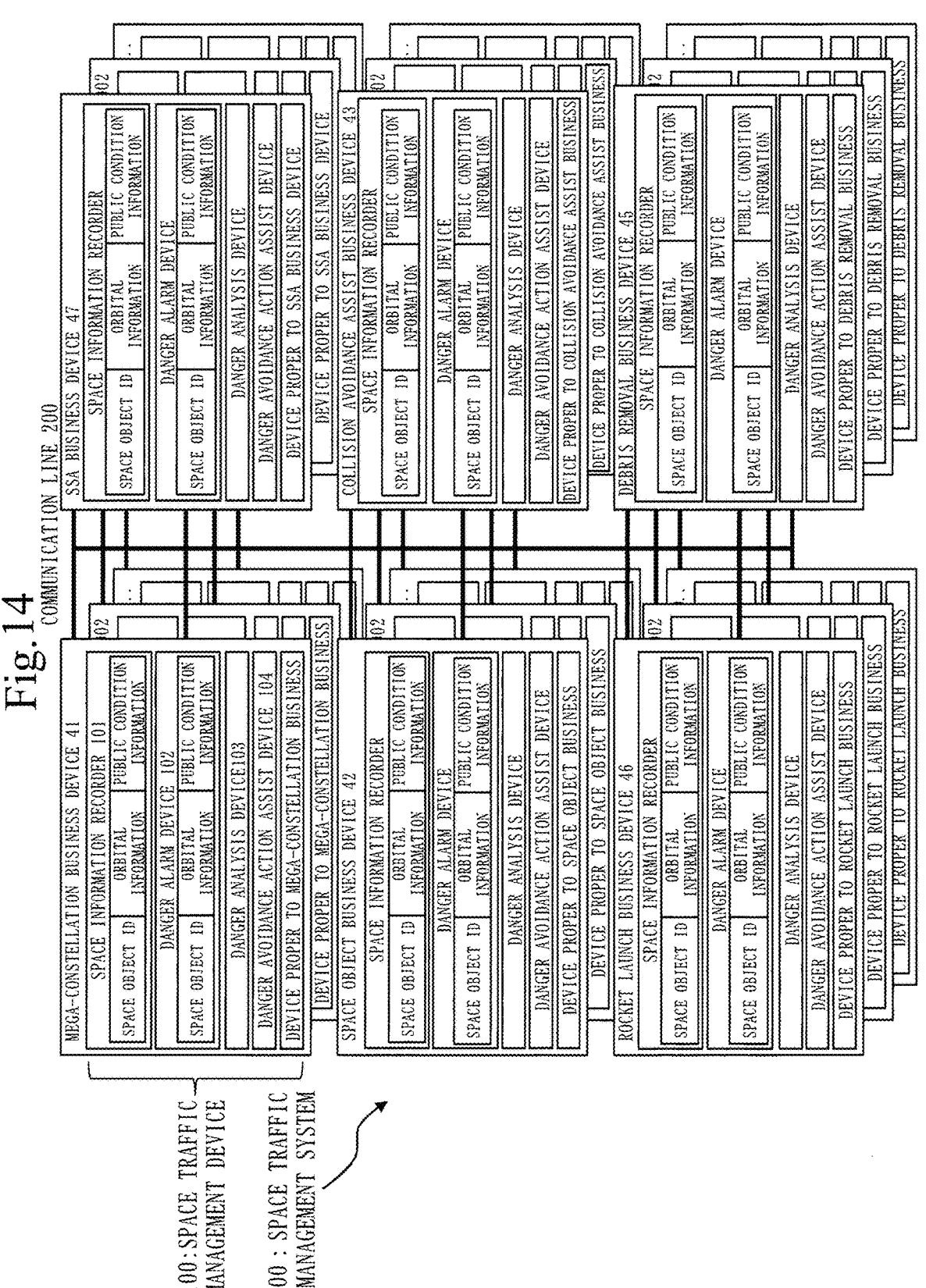
FIG. 14 presents an overall configuration example of a space traffic management system according to Embodiment 1.

FIG. 14 is a diagram illustrating an overall configuration example of the space traffic management system 500 according to the present embodiment.

Figure 15:
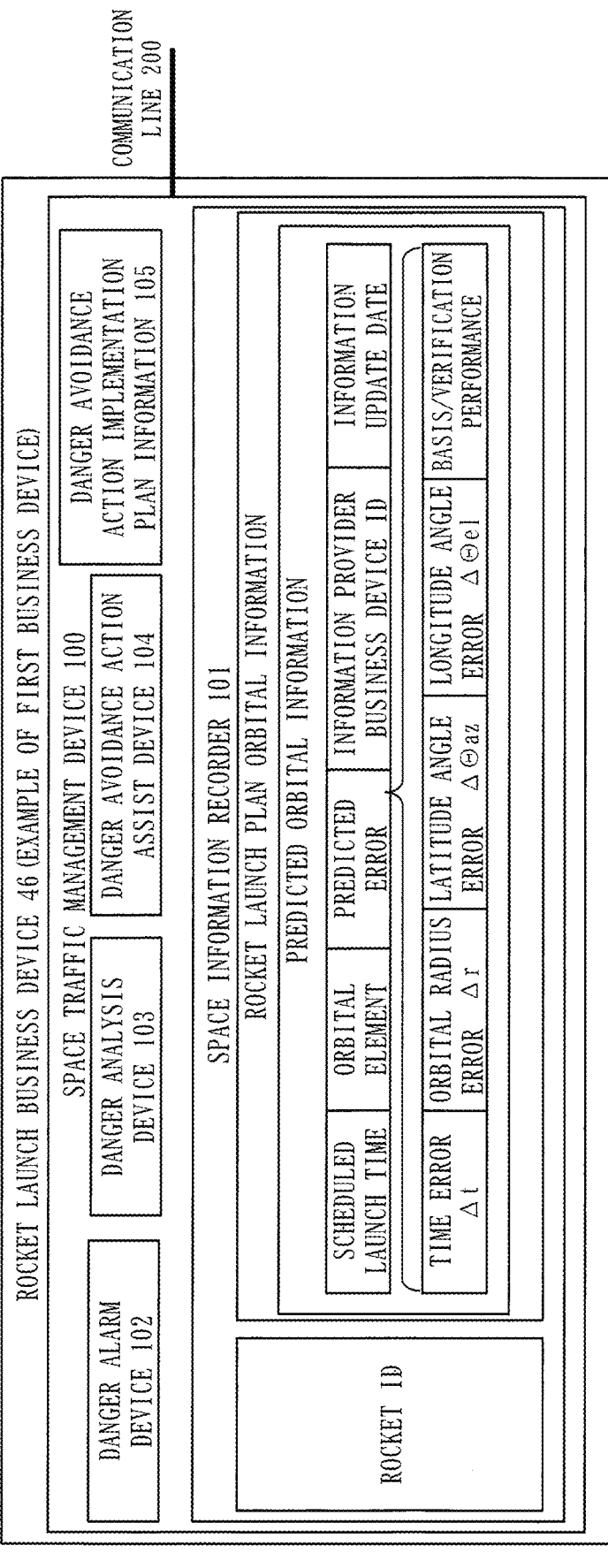
FIG. 15 is a diagram illustrating an example of a configuration of the space traffic management system according to Embodiment 1.

FIG. 15 is a diagram illustrating a detailed configuration example of the rocket launch business device 46 according to the present embodiment.

Figure 16:
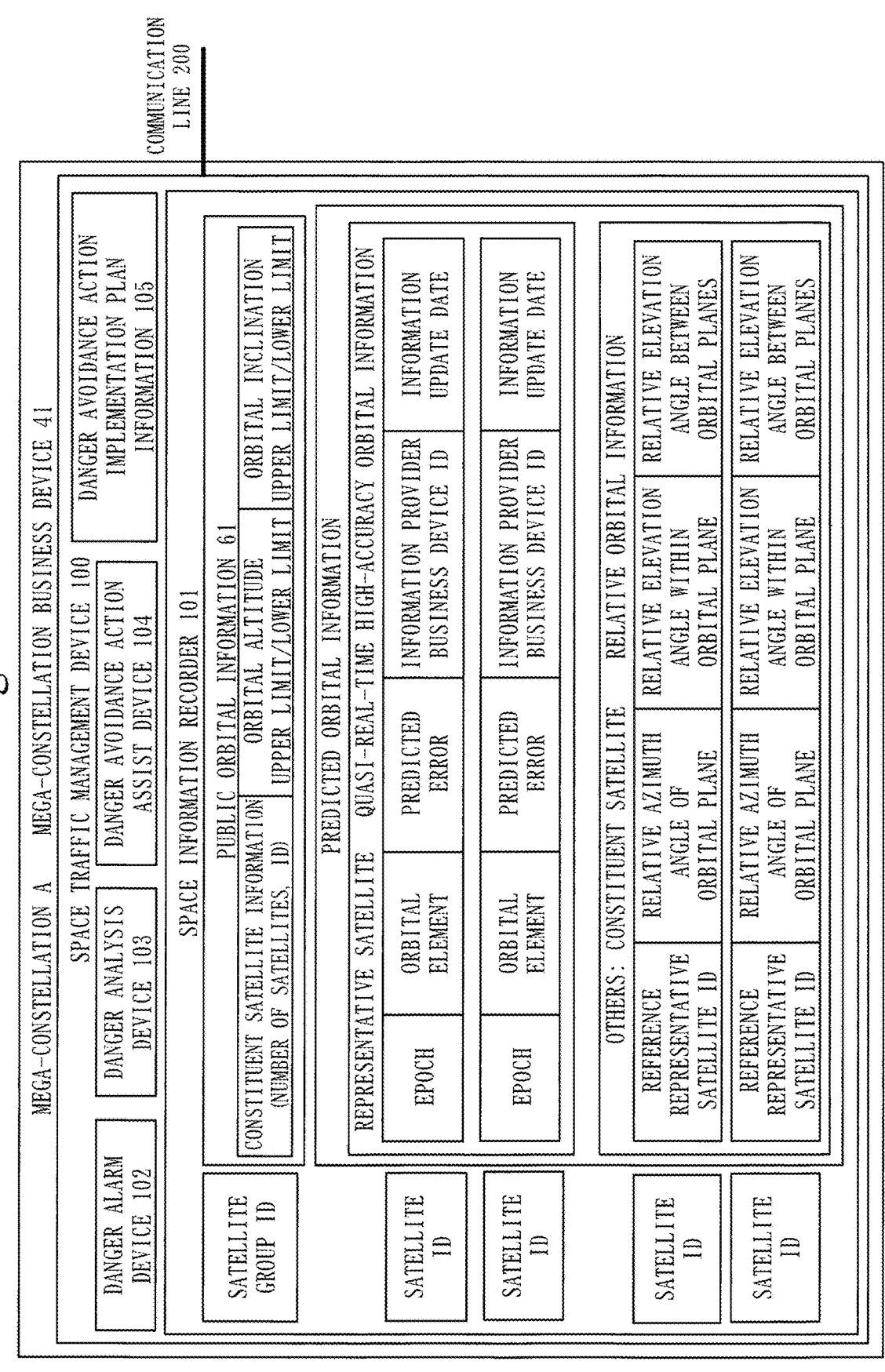
FIG. 16 presents a detailed configuration example of the mega-constellation business device according to Embodiment 1.

FIG. 16 is a diagram illustrating a detailed configuration example of the mega-constellation business device 41 according to the present embodiment.

The plurality of space traffic management devices 100 provided to the space traffic management system 500 are connected to each other via a communication line 200. The space traffic management devices 100 are individually provided to the plurality of mega-constellation business devices 41, the space object business device 42, the collision avoidance assist business device 43, the space object management business device 44, the debris removal business device 45, the rocket launch business device 46, the SSA business device 47, and the rocket launch assist business device 48. Although not illustrated in FIG. 14, the space object management business device 44 and the rocket launch assist business device 48 are also connected to each other via the communication line 200, just as the other business devices 40 are.

There may be a plurality of business devices 40. Alternatively, there may be one business device 40.

<Mega-Constellation Business Device 41>

The space traffic management device 100 of the mega-constellation business device 41 is provided with the space information recorder 101, a danger alarm device 102, a danger analysis device 103 to perform orbital analysis of a space object, a danger avoidance action assist device 104, and a danger avoidance action implementation plan information 105.

The space traffic management device 100 mounted in the mega-constellation business device 41 specifies one to a plurality of representative satellites 331 from the mega-constellation satellite group flying on orbits having the same nominal orbital altitude. The space traffic management device 100 has quasi-real-time high-accuracy orbital information of the representative satellite 331, and orbital information relative values of the constituent satellites 332, other than the representative satellite 331, relative to the representative satellite 331. The space traffic management device 100 shares the quasi-real-time high-accuracy orbital information of the representative satellite 331, and the orbital information relative values of the constituent satellites 332 relative to the representative satellite 331, with the other space traffic management devices 100 mounted in the plurality of business devices 40.

In the space information recorder 101, one to a plurality of representative satellites 331 are specified from the mega-constellation satellite group flying on orbits having the same nominal orbital altitude. The space information recorder 101 records the quasi-real-time high-accuracy orbital information of the representative satellite 331 and the orbital information relative values of the constituent satellites 332 relative to the representative satellite 331. These pieces of information are shared with the space information recorders 101 mounted in the other business devices 40, in a common format via the communication line 200.

The space information recorder 101 of the mega-constellation business device 41 records orbital information of satellites constituting a mega-constellation.

The space information recorder 101 is provided with public orbital information associated with a satellite group ID that identifies a satellite group, and the quasi-real-time high-accuracy orbital information associated with a satellite ID that identifies the representative satellite 331. Further, the space information recorder 101 is provided with relative orbital information associated with the satellite ID that identifies the constituent satellite 332.

The public orbital information is orbital information that can be disclosed to the other business devices. Constituent satellite information such as a number of satellites constituting the satellite group and satellite IDs of the satellites, an upper limit and lower limit of an orbital altitude of the satellite group, and an upper limit and lower limit of an orbital inclination of the satellite group are set in the public orbital information.

The quasi-real-time high-accuracy orbital information is predicted orbital information per satellite constituting the satellite group. A specific example of the predicted orbital information is the orbit prediction information 51 of FIG. 12.

Figure 17:
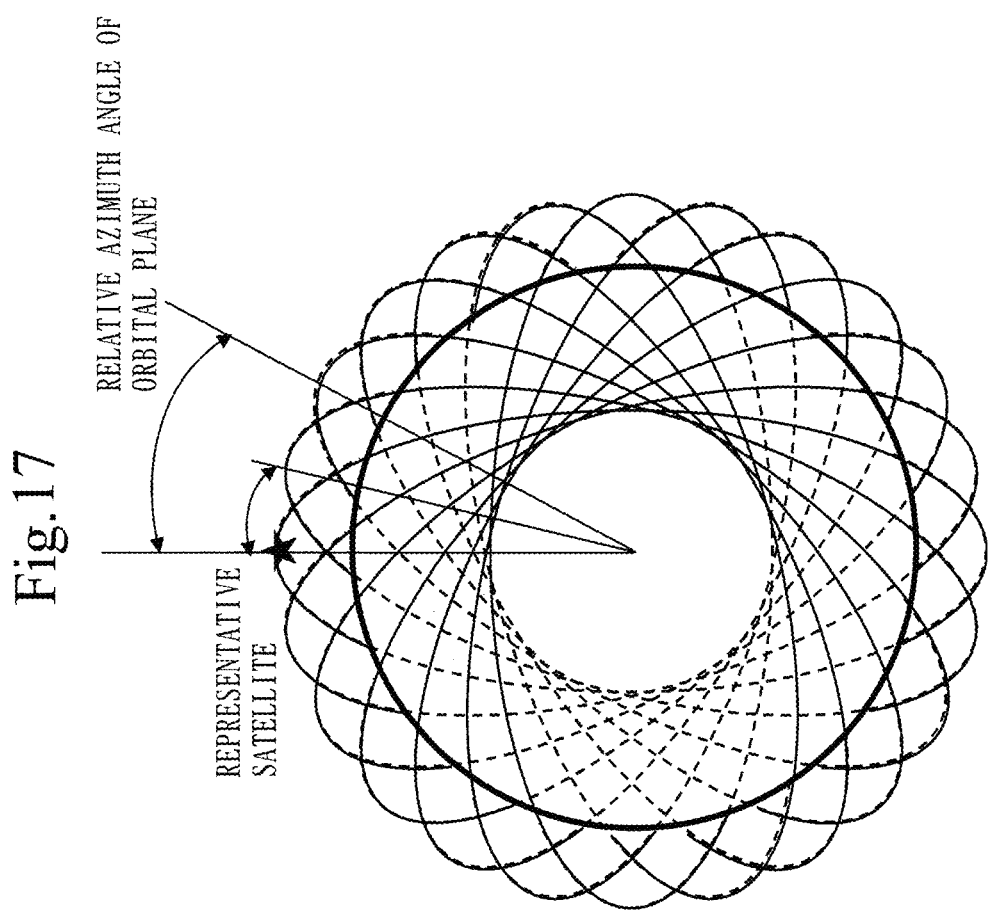
FIG. 17 is a diagram illustrating a relative azimuth angle of an orbital plane according to Embodiment 1.

FIG. 17 is a diagram illustrating a relative azimuth angle of an orbital plane according to the present embodiment.

Figure 18:
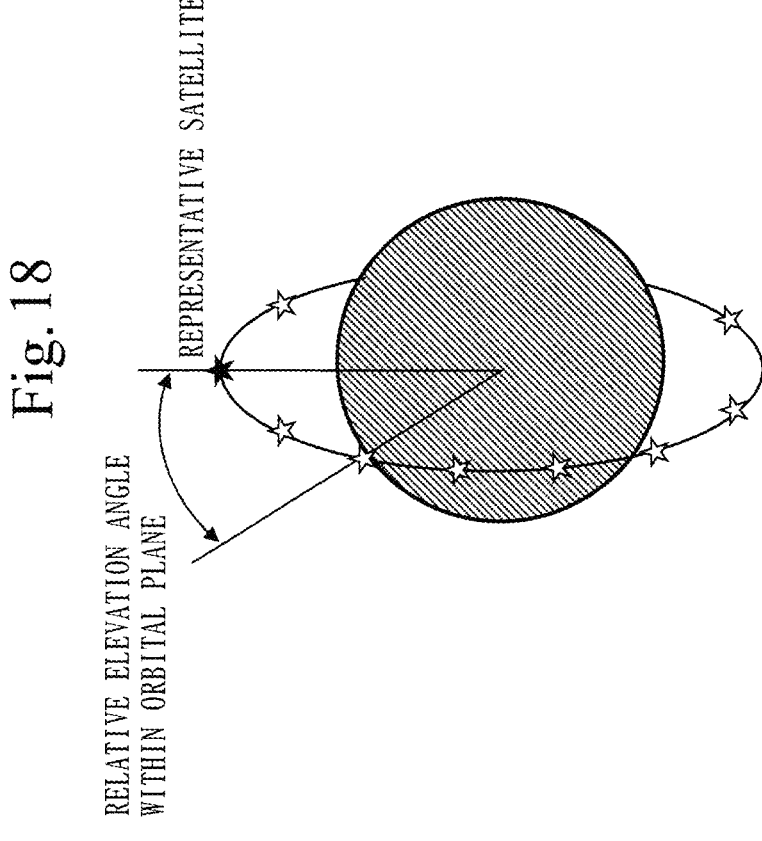
FIG. 18 is a diagram illustrating a relative elevation angle within an orbital plane according to Embodiment 1.

FIG. 18 is a diagram illustrating a relative elevation angle within an orbital plane according to the present embodiment.

Figure 19:
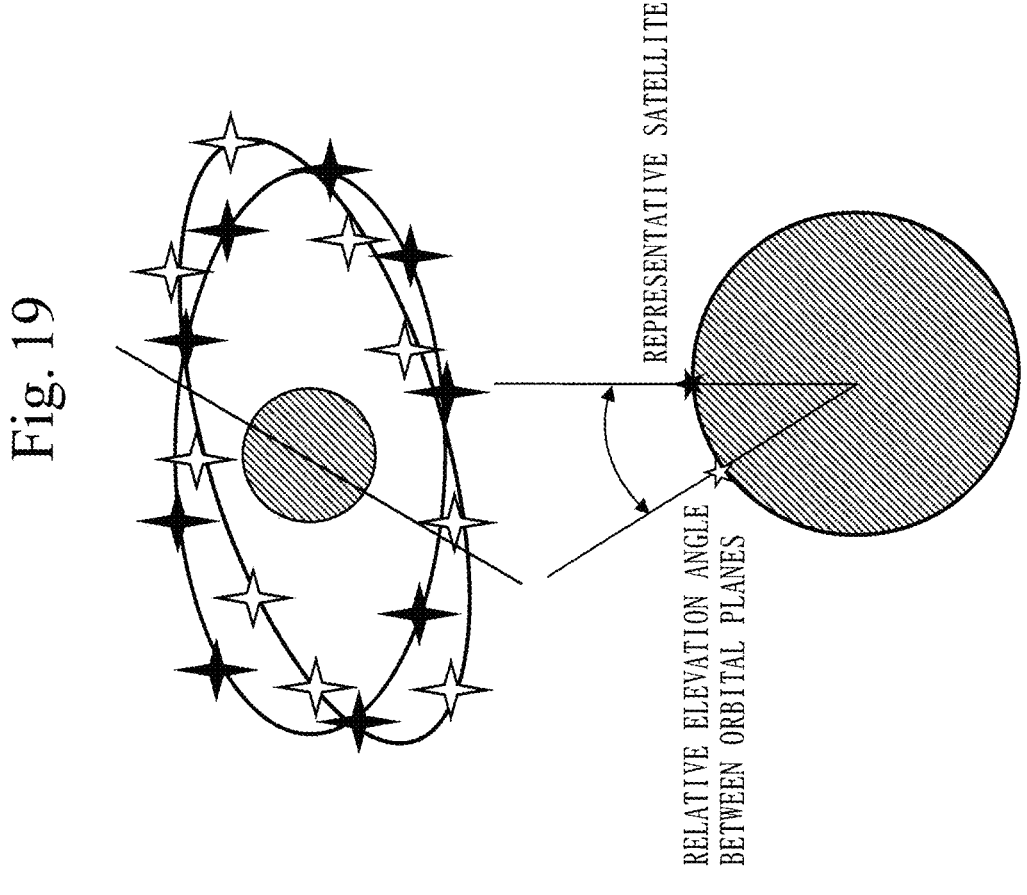
FIG. 19 is a diagram illustrating a relative elevation angle between orbital planes according to Embodiment 1.

FIG. 19 is a diagram illustrating a relative elevation angle between orbital planes according to the present embodiment.

In the relative orbital information of the constituent satellite 332 of FIG. 16, a representative satellite ID as a reference, a relative azimuth angle of an orbital plane, a relative elevation angle within an orbital plane, and a relative elevation angle between orbital planes are set as orbital information relative values.

A danger alarm device 102 announces danger of approach or collision of a space object. The danger alarm device 102 is provided with orbital information associated with a space object ID that identifies a space object. Also, the danger alarm device 102 is provided with public condition information that sets a public condition of the orbital information.

A danger analysis device 103 performs orbital analysis of a space object. For example, the danger analysis device 103 is an example of a collision analysis unit that analyzes collision of an unsteady-operation space object with an individual satellite which constitutes a mega-constellation satellite group. For example, the server 212 provided to the space traffic management device 100 of the mega-constellation business device 41 analyzes collision of an unsteady-operation space object with an individual satellite which constitutes a mega-constellation satellite group.

A danger avoidance action assist device 104 formulates role division of an avoidance action against a space object. For example, the danger avoidance action assist device 104 is an example of a countermeasure formulating unit that formulates a collision avoidance countermeasure when collision of a mega-constellation with an unsteady-operation space object is predicted. For example, the server 212 provided to the space traffic management device 100 of the mega-constellation business device 41 formulates a collision avoidance countermeasure when collision is predicted.

An avoidance action plan formulated by the danger avoidance action assist device 104 is set in a danger avoidance action implementation plan information 105.

Predicted orbital information and performance orbital information may be set in the quasi-real-time high-accuracy orbital information to be associated with the satellite ID. The predicted orbital information and the performance orbital information are set in a real-time manner and accurately.

Also, unsteady orbital information may be set in the space information recorder 101 of the mega-constellation business device 41. Predicted orbital information about a space object that performs unsteady operation in an own mega-constellation is set in the unsteady orbital information. An epoch, orbital elements, and predicted errors are set in the predicted orbital information, just as in FIG. 12.

<Space Traffic Management Method>

In the space traffic management system 500 according to the present embodiment, a space traffic management method of avoiding collision of a satellite constituting a mega-constellation with a space object will be described.

FIG. 20 is a flowchart of the space traffic management method according to the present embodiment.

Example 1 of Space Traffic Management Method

A space traffic management system 500 conducts a space traffic management method of ensuring flight safety by connecting space traffic management devices individually mounted in business devices which are a mega-constellation business device 41, a first business device that manages a space object, and a second business device, via a communication line.

<<Step S101>>

A space traffic management device 100 mounted in the mega-constellation business device 41 has the configuration described above, and shares information with the space traffic management device 100 mounted in the second business device.

<<Step S102>>

The second business device includes a space information recorder 101, a danger analysis device 103, and a danger avoidance action assist device 104. The second business device records the quasi-real-time high-accuracy orbital information of a representative satellite 331, orbital information relative values of the constituent satellites relative to the representative satellite 331, and the information of the space object, to the space information recorder 101. The quasi-real-time high-accuracy orbital information and the orbital information relative values are acquired from the space traffic management device 100 mounted in the mega-constellation business device. The information of the space object is acquired from the space traffic management device 100 mounted in the first business device.

<<Step S103>>

The danger analysis device 103 derives collision avoidance information including a timing or a condition at which or under which collision does not occur with any one of the satellites constituting the plurality of mega-constellation satellite groups.

<<Step S104>>

The danger avoidance action assist device 104 notifies the first business device of the collision avoidance information.

Specifically, the mega-constellation business device 41 includes a plurality of mega-constellation business devices each of which manages a mega-constellation. The first business device is a space object business device 42 of an unsteady-operation space object. The second business device is a collision avoidance assist business device 43.

A rocket launch business device 46 of FIG. 15 is an example of the first business device.

FIG. 21 is a diagram illustrating a detailed configuration example of a rocket launch assist business device 48 which is an example of the second business device according to the present embodiment.

The collision avoidance assist business device 43 records the quasi-real-time high-accuracy orbital information of the representative satellite 331, the orbital information relative values of constituent satellites 332 relative to the representative satellite 331, and planned orbital information being information of the space object, to the space information recorder 101. The quasi-real-time high-accuracy orbital information and the orbital information relative values are acquired from the space traffic management devices 100 mounted in individual ones of the plurality of mega-constellation business devices 41. The planned orbital information is acquired from the space traffic management device 100 mounted in the space object business device 42.

FIG. 21 illustrates the rocket launch assist business device 48 as an example of the second business device. Rocket launch plan orbital information is set in FIG. 21. When the second business device is the collision avoidance assist business device 43 of Example 1, a space object ID of the unsteady-operation space object and planned orbital information (unsteady orbital information) of an unsteady-operation space object are set.

The danger analysis device 103 derives, as collision avoidance information, a timing and an orbital condition at which and under which collision does not occur with any one of the satellites constituting the plurality of mega-constellation satellite groups.

The danger avoidance action assist device 104 notifies the space object business device 42 of the timing and the orbital condition.

Example 2 of Space Traffic Management Method

In Example 2, the first business device is a rocket launch business device 46. The second business device is a rocket launch assist business device 48 which assists rocket launch.

The rocket launch assist business device 48 records the quasi-real-time high-accuracy orbital information of a representative satellite 331, the orbital information relative values of constituent satellites 332 relative to the representative satellite 331, and rocket launch plan orbital information being information of the space object, to a space information recorder 101. The quasi-real-time high-accuracy orbital information and the orbital information relative values are acquired from space traffic management devices 100 mounted in individual ones of the plurality of mega-constellation business devices 41. The rocket launch plan orbital information is acquired from a space traffic management device 100 mounted in the rocket launch business device 46.

A danger analysis device 103 derives, as collision avoidance information, a rocket launch timing at which collision does not occur with any one of the satellites constituting the plurality of mega-constellation satellite groups. In rocket launch, the rocket launch timing must be a timing that enables avoidance of collision with all mega-constellations which the rocket passes through during a launch process.

A danger avoidance action assist device 104 notifies the rocket launch business device 46 of the rocket launch timing.

Example 3 of Space Traffic Management Method

In Example 3, the first business device is a space object management business device 44 for deorbiting in an orbital descent process. The second business device is a collision avoidance assist business device 43.

The collision avoidance assist business device 43 records the quasi-real-time high-accuracy orbital information of a representative satellite 331, the orbital information relative values of constituent satellites 332 relative to the representative satellite 331, and planned orbital information of the space object, being information of the space object, during the orbital descent process, to a space information recorder 101. The quasi-real-time high-accuracy orbital information and the orbital information relative values are acquired from space traffic management devices 100 mounted in individual ones of a plurality of mega-constellation business devices 41. The planned orbital information is acquired from a space traffic management device 100 mounted in the space object management business device 44.

FIG. 21 illustrates a rocket launch assist business device 48 as an example of the second business device. Rocket launch plan orbital information is set in FIG. 21. When the second business device is the collision avoidance assist business device 43 of Example 3, a space object ID of the space object in the orbital descent process and planned orbital information of the space object in the orbital descent process are set.

A danger analysis device 103 derives, as collision avoidance information, a timing and an orbital condition at which and under which collision does not occur with any one of the satellites constituting the plurality of mega-constellation satellite groups.

A danger avoidance action assist device 104 notifies the space object management business device 44 of the timing and the orbital condition.

If the space object in the deorbit process does not have an orbital control function, a collision avoidance assist business device must guide a timing to avoid collision with all of the plurality of mega-constellations.

Example 4 of Space Traffic Management Method

In Example 4, the first business device is a space object management business device 44 or a debris removal business device 45, the space object management business device 44 being capable of performing active orbital descent operation and being for an orbital descent process. The second business device is a space situational awareness business device 47 (SSA business device) which runs a space situational awareness business, or a collision avoidance assist business device 43.

The SSA business device 47 or the collision avoidance assist business device 43 records quasi-real-time high-accuracy orbital information of a representative satellite 331, orbital information relative values of constituent satellites 332 relative to the representative satellite 331, and orbital-descent planned orbital information of a space object, or of a debris removal satellite, to a space information recorder 101. The quasi-real-time high-accuracy orbital information and the orbital information relative values are acquired from a space traffic management device 100 mounted in a mega-constellation business device 41. The orbital-descent planned orbital information is information of the space object, and is acquired from a space traffic management device 100 mounted in the space object management business device 44 or the debris removal business device 45.

FIG. 21 illustrates the rocket launch assist business device 48 as an example of the second business device. Rocket launch plan orbital information is set in FIG. 21. When the second business device is the SSA business device 47 or collision avoidance assist business device 43 of Example 4, a space object ID of the space object or debris removal satellite in the orbital descent process and orbital-descent planned orbital information of the space object or debris removal satellite are set.

A danger analysis device 103 derives, as collision avoidance information, a timing and an orbital condition at which and under which collision does not occur with any one of the satellites constituting the mega-constellation satellite group.

A danger avoidance action assist device 104 notifies the space object management business device 44 or the debris removal business device 45 of the timing and the orbital condition.

The space object that can perform active orbital descent operation, or the debris removal satellite should only pass through mega-constellation altitude zones sequentially. Therefore, a constraint condition "a plurality of mega-constellations" is not necessary.

Example 5 of Space Traffic Management Method

In Example 5, a space traffic management system 500 is provided with a mega-constellation business device 41, and a debris removal business device 45 or a rocket launch business device 46. The space traffic management system 500 performs a space traffic management method of ensuring flight safety by connecting space traffic management devices 100 individually mounted in business devices 40 via a communication line 200.

A space traffic management device 100 mounted in the mega-constellation business device 41 specifies one to a plurality of representative satellites 331 from the mega-constellation satellite group flying on orbits having the same nominal orbital altitude. The space traffic management device 100 has quasi-real-time high-accuracy orbital information of the representative satellite 331, and orbital information relative values of constituent satellites 332, other than the representative satellite 331, relative to the representative satellite 331. The space traffic management device 100 shares the quasi-real-time high-accuracy orbital information of the representative satellite 331 and the orbital information relative values of the constituent satellites 332 relative to the representative satellite 331, with the space traffic management device 100 mounted in the debris removal business device 45 or rocket launch business device 46.

The debris removal business device 45 or the rocket launch business device 46 is provided with a space information recorder 101 and a danger analysis device 103. The debris removal business device 45 or the rocket launch business device 46 records quasi-real-time high-accuracy orbital information of the representative satellite 331, orbital information relative values of the constituent satellites 332 relative to the representative satellite 331, and orbital-descent planned orbital information of a debris removal satellite, or planned orbital information for rocket launch, to a space information recorder 101. The quasi-real-time high-accuracy orbital information and the orbital information relative values are acquired from the space traffic management device 100 mounted in the mega-constellation business device 41.

A danger analysis device 103 derives a timing and an orbital condition at which and under which collision does not occur with any one of the satellites constituting the mega-constellation satellite groups.

In this manner, in Example 5, the debris removal business operator or the rocket launch business operator can perform danger analysis independently, and can perform orbital descent or rocket launch while avoiding collision.

In the present embodiment, the following business devices have been described.

A collision avoidance assist business device employed in a space traffic management method is a rocket launch assist device, a space situational awareness business device, or a space management device such as a space port, or a business device that supervises space traffic management, and ensures flight safety by the space traffic management method.

A space object business device of an unsteady-operation space object, employed in a space traffic management method is a satellite business device for an orbital descent process, a debris removal satellite for an orbital descent process, or a rocket launch business operator, and ensures flight safety by the space traffic management method.

A mega-constellation business device ensures flight safety by the space traffic management method described above.

A rocket launch assist business device ensures flight safety by the space traffic management method described above.

A collision avoidance assist business device ensures flight safety by the space traffic management method described above.

A space situational awareness business device (SSA business device) ensures flight safety by the space traffic management method described above.

A debris removal business device ensures flight safety by the space traffic management method described above.

A rocket launch business device ensures flight safety by the space traffic management method described above.

A space object business device ensures flight safety by the space traffic management method described above.

A space object management business device ensures flight safety by the space traffic management method described above.

Description on Effect of Present Embodiment

With the space traffic management method according to the present embodiment, quasi-real-time high-accuracy orbital information can be handled even by a business operator other than a mega-constellation business operator. Therefore, with the space traffic management method according to the present embodiment, analysis of danger including a mega-constellation can be performed by a business operator on its own, such as a rocket launch assist business operator, a collision avoidance assist business operator, an SSA business operator, a debris removal business operator, and a rocket launch business operator.

Other Configurations

In the present embodiment, the functions of the space traffic management device 100 are implemented by software. A modification may be possible in which the functions of the space traffic management device 100 are implemented by hardware.

Figure 23:
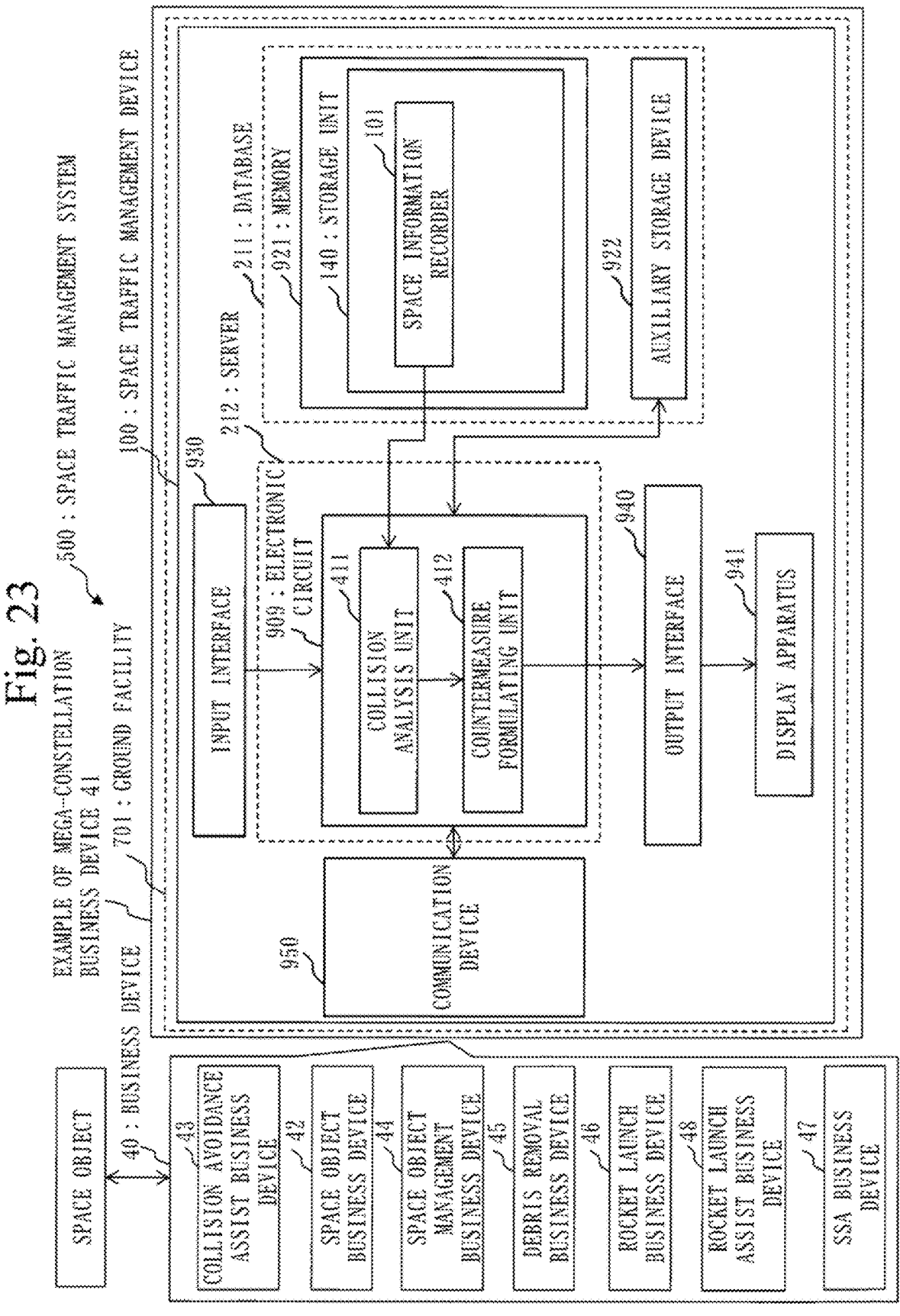
FIG. 23 presents a hardware configuration example of a space traffic management device of a mega-constellation business device according to a modification of Embodiment 1.

FIGS. 22 and 23 are diagrams each illustrating a configuration of a space traffic management device 100 according to a modification of the present embodiment.

The space traffic management device 100 is provided with an electronic circuit 909 in place of a processor 910.

The electronic circuit 909 is a dedicated electronic circuit that implements the functions of the space traffic management device 100.

The electronic circuit 909 is specifically a single circuit, a composite circuit, a programmed processor, a parallel-programmed processor, a logic IC, a GA, an ASIC, or an FPGA. GA stands for Gate Array.

The functions of the space traffic management device 100 may be implemented by one electronic circuit, or may be distributed among a plurality of electronic circuits and implemented by them.

Another modification may be possible in which some of the functions of the space traffic management device 100 are implemented by an electronic circuit and the remaining functions are implemented by software.

A processor and an electronic circuit are called processing circuitry as well. That is, the functions of the space traffic management device 100 are implemented by processing circuitry.

Embodiment 2

In the present embodiment, a difference from Embodiment 1 and an additional point to Embodiment 1 will mainly be described.

In the present embodiment, a configuration having the same function as in Embodiment 1 will be denoted by the same reference sign, and its description will be omitted.

Due to emergence of mega-constellation business operators, currently, about 50,000 satellites fly at an orbital altitude of 340 km to 1,300 km as if to exhaustively cover the sky. This situation makes it difficult to secure flight safety in rocket launch. A mode will be described in which flight safety in rocket launch is secured by realizing a framework that performs central management of quasi-real-time high-accuracy orbital information of a plurality of mega-constellations.

Studies have been in progress on sharing orbital information of a space object among business operators by building a public information system called Open Architecture Data Repository (OADR) so that flight safety of the space object is ensured.

The present embodiment will describe a mode of ensuring flight safety of a space object by the public information system called OADR.

When setting up an OADR as a public institution under international cooperation, there is a possibility that the OADR is authorized to make an instruction or request to a business operator beyond borders.

For example, in central management of orbital information of space objects possessed by business operators around the world, it is rational if the OADR can make an instruction or a request to provide orbital information under a rule based on an international consensus.

When a particular country sets up an OADR as a public institution, there is a possibility that the OADR is authorized to make an instruction or request to business operators of the relevant country.

There is also a possibility that the OADR forms a framework of disclosing information to business operators of the relevant country unconditionally while disclosing information conditionally to the other business operators.

As a public condition, it is possible to set entries such as fee charging, price setting, disclosure item restriction, accuracy restriction of public information, disclosure frequency restriction, and non-disclosure to a specific business operator.

For example, a difference of no charging or fee charging, or a difference in an amount of fee for information acquisition may arise between the relevant country and the other countries. How the public condition is set by the OADR will be influential from the viewpoint of framework making for space traffic management or industrial competitive power.

It is rational that, regarding space-object confidential information which serves security, the OADR being set up by a country as a public institution possesses the confidential information but keeps the confidential information closed to the outside. Therefore, there is a possibility that the OADR is provided with a database for storing non-public information, in addition to a database for information disclosure.

In addition, among pieces of space object information possessed by private business operators, there is information that cannot be disclosed to the public because, for example, the information belongs to a corporate secret. In addition, there is information that is not appropriate for public disclosure, because the information is under constant maneuver control and accordingly an amount of information or an update frequency of the information is enormous.

When conducting danger analysis and analysis evaluation related to approach or collision of a space object, it is necessary that orbital information of all space objects be dealt with regardless of whether the space object is confidential or not. For this reason, when the OADR as a public institution conducts danger analysis including confidential information and danger is predicted as a result of analysis evaluation, it is rational to restrict a publication target or a publication content and to conduct conditional disclosure. For example, it is rational to restrict a publication target or a publication content and to conduct conditional disclosure by processing information into disclosable information, and disclosing only orbital information of a risky timeframe to a disclosure target that contributes to danger avoidance.

In the future, when the number of on-orbit objects increases, the risk of approach or collision increases, various danger avoidance countermeasures will be needed, such as a means with which a debris removal business operator removes dangerous debris, and a means with which a mega-constellation business operator changes an orbital position or a passing timing so as to avoid collision. If the OADR, being a public institution, can instruct or request a business operator to execute a danger avoidance action, a very large effect can be expected in ensuring flight safety of space.

There are space objects managed by an institution, such as an emerging country venture business operator or a university, that is inexperienced in the space business and lacks information that serves danger avoidance. When it is predicted that a space object managed by such an institution which is inexperienced in the space business and lacks information that serves danger avoidance will intrude into an orbital altitude zone where a mega-constellation flies, the OADR intermediates to transmit the relevant information to the business operator in need of the information, so that the danger can be avoided quickly and effectively.

In addition, when implementation of a danger avoidance countermeasure, or space insurance, is mediated or introduced to private business operators, it will contribute to promotion and industrialization of space traffic management.

The OADR may be realized in the following modes.

A mode where the OADR is provided with only a public database.

A mode where the OADR possesses a danger analysis means, a collision avoidance assist means, or a space situational awareness (SSA) means to contribute to danger avoidance independently.

A mode where the OADR gives an instruction or a request to a business operator, or performs mediation or introduction to a business operator, thus contributing to danger avoidance through information management.

For realizing the OADR, there are various possibilities other than the above-mentioned modes.

Note that "the OADR mediates implementation of a space traffic management method" signifies a case where, for example, an entity implementing a space traffic management method includes a plurality of external business devices other than the OADR, and the OADR does not issue a compulsive order but encourages implementation of the method by intermediating among the plurality of business devices. "The OADR mediates implementation of a space traffic management method" is paraphrased as, for example, "the OADR intermediates so that a plurality of external business devices other than the OADR cooperate with each other to implement a space traffic management method". Alternatively, "mediation" may be replaced with "teaching".

A configuration example of the OADR according the present embodiment will be described below.

Configuration Example 1 of OADR

Figure 24:
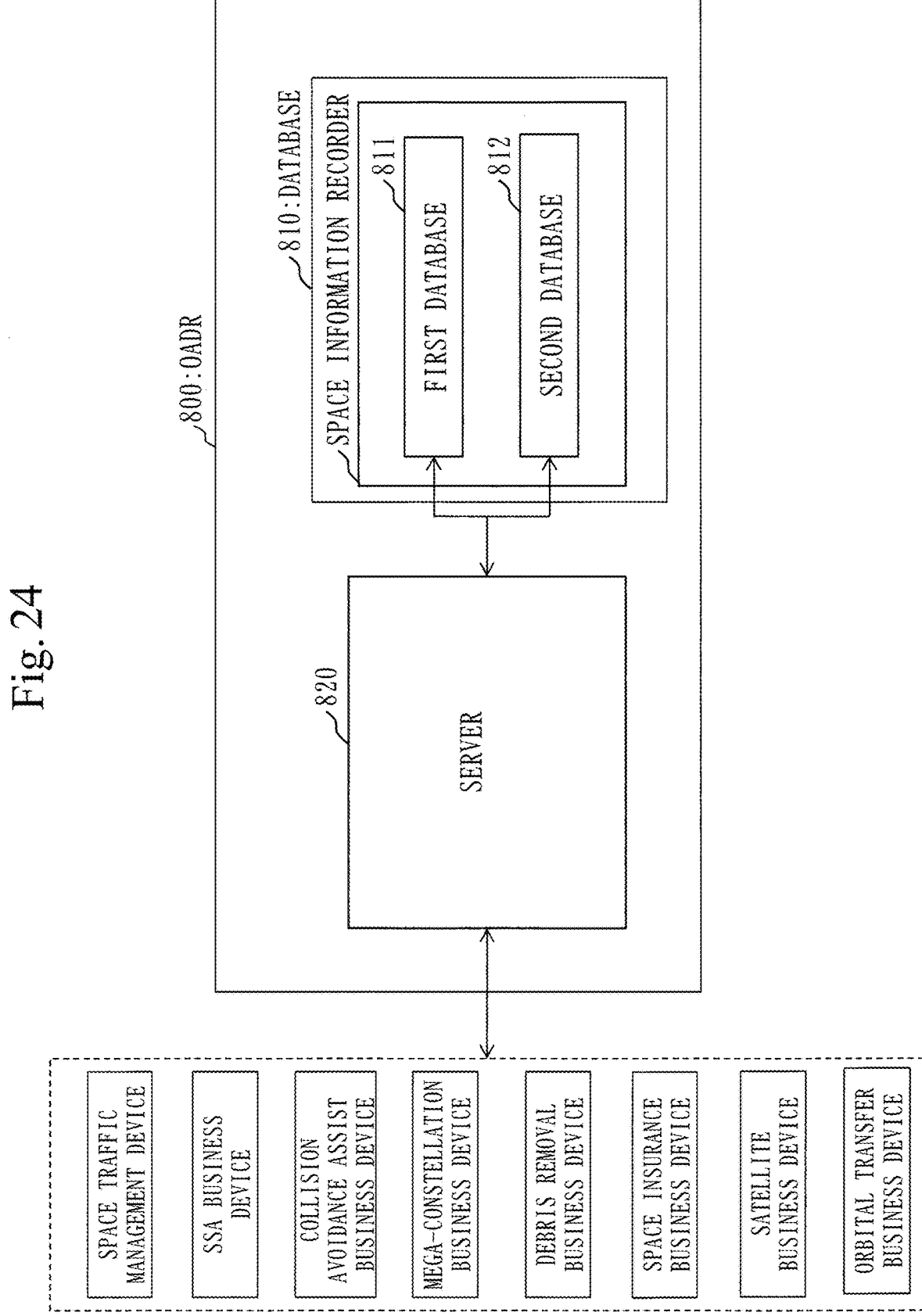
FIG. 24 presents a function configuration example of an OADR according to Embodiment 2.

FIG. 24 is a diagram illustrating an OADR 800 as Configuration Example 1 according to the present embodiment.

The OADR 800 as Configuration Example 1 is provided with a space information recorder 101.

The OADR 800 is provided with the space information recorder 101 having a configuration described in Embodiment 1, as a database 810 being a public database.

As the OADR 800 is provided with the space information recorder 101, information can be shared among business operators, achieving an effect of contributing to danger avoidance.

Configuration Example 2 of OADR

Figure 25:
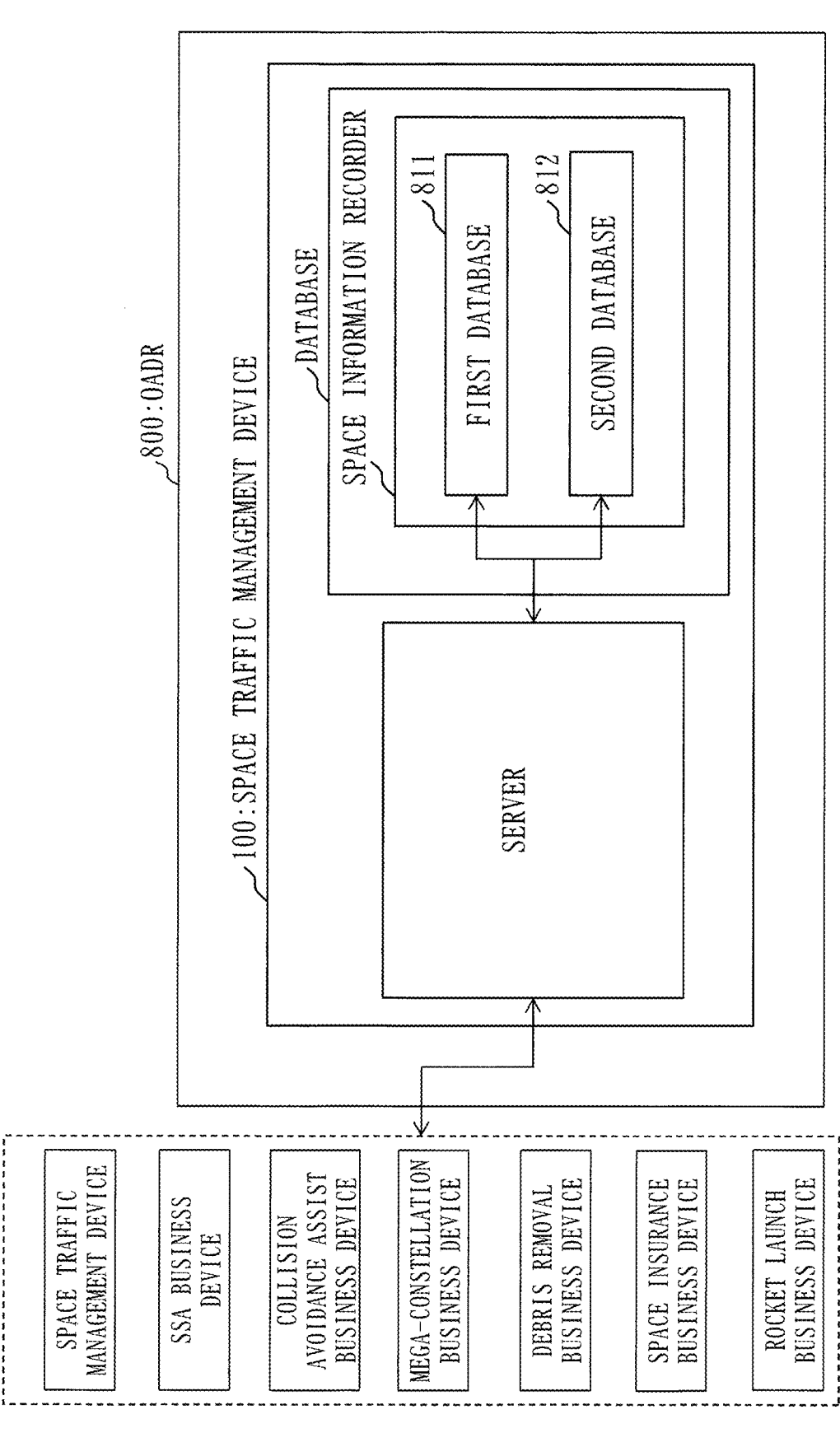
FIG. 25 presents a function configuration example of the OADR according to Embodiment 2.

FIG. 25 is a diagram illustrating an OADR 800 as Configuration Example 2 according to the present embodiment.

The OADR 800 as Configuration Example 2 is provided with the space traffic management device 100 described in Embodiment 1, and executes the space traffic management method described in Embodiment 1.

With the OADR 800 as Configuration Example 2, information is shared among business operators, achieving an effect of contributing to danger avoidance.

Configuration Example 3 of OADR

FIG. 26 is a diagram illustrating an OADR 800 as Configuration Example 3 according to the present embodiment.

The OADR 800 as Configuration Example 3 is provided with the collision avoidance assist business device 43 described in Embodiment 1.

With the OADR 800 as Configuration Example 3, as the OADR 800 is provided with the collision avoidance assist business device 43, the OADR 800 takes an initiative in sharing information among business operators, achieving an effect of danger avoidance.

Configuration Example 4 of OADR

The OADR 800 illustrated in FIG. 24 is a public information system to disclose orbital information of a space object. The OADR 800 is provided with the database 810 to store the orbital information of the space object, and a server 820.

The database 810 is provided with a first database 811 to store public information and a second database 812 to store non-public information.

The server 820 acquires space object information including non-public information from all or some of business devices which are: a space traffic management device; a space situational awareness business device (SSA business device); a collision avoidance assist business device; a mega-constellation business device; and a debris removal business device, and stores the acquired space object information to the second database 812. The space traffic management device is provided to, for example, CSpOC.

Conventionally, the U.S. CSpOC is not provided with a bi-directional line, and announces a danger alarm unidirectionally. If CSpOC is provided with a space traffic management device, CSpOC can contribute to space traffic management by communication of the space traffic management device with the other business devices via a bi-directional communication line.

The server 820 generates conditional public information restricting a publication target and a publication content and stores the generated information to the first database 811.

Then, the server 820 transmits the conditional public information only to a particular business device among the SSA business device, the collision avoidance assist business device, the mega-constellation business device, the debris removal business device, and a space insurance business device which deals with a space insurance.

The OADR 800 of Configuration Example 4 mediates implementation of the space traffic management method described in Embodiment 1 while implementing the above functions.

There is a possibility that space object confidential information possessed by CSpOC and serving safety security is disclosed only to the OADR. A risk of approach or collision, including the confidential information, must be analyzed and must be predicted.

After the information is processed into conditional disclosable information, the conditional public information which serves collision avoidance assist is shared only to a business device related to a collision risk. Hence, even a private business operator can take a collision avoidance action.

Among pieces of space object information possessed by the private business operators, regarding space object information that cannot be disclosed to the public, the OADR processes the information into conditional disclosable information likewise, so that the collision avoidance becomes possible.

Configuration Example 5 of OADR

The OADR 800 illustrated in FIG. 26 is provided with the collision avoidance assist business device 43.

A database 810 is provided with a first database 811 to store public information and a second database 812 to store non-public information.

A server 820 acquires space object information including non-public information from all or some of business devices which are: a space traffic management device; an SSA business device; another collision avoidance assist business device; a mega-constellation business device; a debris removal business device, and a space object business device, and stores the acquired space object information to the second database 812. The space traffic management device is provided to, for example, CSpOC.

Another collision avoidance assist business device is a collision avoidance assist business device other than the collision avoidance assist business device possessed by the OADR 800.

The server 820 generates conditional public information restricting a publication target and a publication content and stores the generated information to the first database 811.

Then, the server 820 transmits the conditional public information only to a particular business device among the SSA business device, another collision avoidance assist business device, the mega-constellation business device, the debris removal business device, the space object business device, and a space insurance business device which deals with a space insurance.

When the ORDR serves as the collision avoidance assist business operator as in Configuration Example 5, the same effect as in Configuration Example 4 can be obtained.

Configuration Example 6 of OADR

An OADR 800 is a public information system to disclose orbital information of a space object, as illustrated in FIG. 24. The OADR 800 is provided with a database 810 to store the orbital information of the space object, and a server 820. The server 820 is also called a space information management server to manage space information.

The database 810 is provided with a first database 811 to store public information and a second database 812 to store non-public information.

The server 820 being a space information management server performs danger analysis by looking up the first database 811 and the second database 812 to. The server 820 performs identification management of free public information and fee-charged public information of the second database 812.

The space object includes a space object whose orbital information is not disclosed due to security requirement. Meanwhile, when performing analysis of a danger such as approach or collision, danger analysis must be performed to include non-public information. Hence, it is rational to separate databases so as to avoid a risk of information leakage.

There is a possibility that free public information and fee-charged public information are mixed in the public information. Therefore, identification management is required when the OADR discloses information to the public.

If the OADR separates non-public data from public data by central management and performs identification management of fee-charged public information and free public information, a principle of Need to Know is kept, and appropriate information management can be performed.

Configuration Example 7 of OADR

A modification of Configuration Example 6 is possible in which a server 820 being a space information management server performs danger analysis by looking up a first database 811 and a second database 812, and the server 820 performs identification management of unconditional public information and conditioned public information of the second database 812.

When a particular country sets up an OADR as a public institution, it is rational to disclose information to a business operator of a relevant country unconditionally while disclosing information to the other business operators conditionally. As the condition to be set, it is possible to set, for example, fee charging, price setting, disclosure item restriction, accuracy restriction of disclosed information, disclosure frequency restriction, and non-disclosure to a specific business operator.

In above Embodiments 1 to 2, individual units in each of the space traffic management system, the space traffic management device, and the business device are described as independent function blocks. However, the space traffic management system, the space traffic management device, and the business device need not have configurations as in the embodiments described above. The function blocks in each of the space traffic management system and the space traffic management device may have any configurations as far as they can implement the functions described in the above embodiments. Also, each of the space traffic management system, the space traffic management device, and the business device may be one device, or may form a system constituted of a plurality of devices.

A plurality of parts out of Embodiments 1 to 2 may be practiced as a combination. Alternatively, one part of these embodiments may be practiced. Also, these embodiments may be practiced as a whole or partly as any combination.

That is, in Embodiments 1 to 2, any parts out of Embodiments 1 to 2 can be combined arbitrarily, or an arbitrary constituent element can be modified. Also, in Embodiments 1 to 2, an arbitrary constituent element can be omitted.

The embodiments described above are essentially preferable exemplifications and are not intended to limit the scope of the present disclosure, the scope of an application product of the present disclosure, and the scope of use of the present disclosure. Various changes can be made to the embodiments described above as necessary.

REFERENCE SIGNS LIST

20: satellite constellation; 21: orbital plane; 211: database; 212: server; 30: satellite; 31: satellite control device; 32: satellite communication device; 33: propulsion device; 34: attitude control device; 35: power supply device; 40: business device; 301: mega-constellation satellite group; 331: representative satellite; 332: constituent satellite; 41: mega-constellation business device; 411: collision analysis unit; 412: countermeasure formulating unit; 431: orbital analysis unit; 432: announcement unit; 42: space object business device; 43: collision avoidance assist business device; 44: space object management business device; 45: debris removal business device; 46: rocket launch business device; 47: SSA business device; 48: rocket launch assist business device; 51: orbit prediction information; 53: debris orbit prediction information; 511: space object ID; 512: predicted epoch; 513: predicted orbital element; 514: predicted error; 60: space object; 70: Earth; 100: space traffic management device; 140: storage unit; 55: orbit control command; 61: public orbital information; 63: unsteady orbital information; 64: real-time high-accuracy orbital information; 500: space traffic management system; 600: satellite constellation forming system; 11, 11b: satellite constellation forming unit; 300: satellite group; 700, 701: ground facility; 510: orbit control command generation unit; 520: analytical prediction unit; 909: electronic circuit; 910: processor; 921: memory; 922: auxiliary storage device; 930: input interface; 940: output interface; 941: display apparatus; 950: communication device; 101: space information recorder; 102: danger alarm device; 103: danger analysis device; 104: danger avoidance action assist device; 105: danger avoidance action implementation plan information; 200: communication line; 800: OADR; 810: database; 811: first database; 812: second database; 820: server.

The invention claimed is:

1. A space traffic management method of ensuring flight safety, comprising:

connecting space traffic management devices individually mounted in business devices with each other via a communication line, the business devices including a mega-constellation business device which manages a mega-constellation consisting of 100 or more satellites, and a first business device and a second business device which manage a space object;

specifying, by a space traffic management device mounted in the mega-constellation business device, a representative satellite, which is a satellite selected from a mega-constellation satellite group flying on orbits having a same nominal orbital altitude;

storing, in the space traffic management device in the mega-constellation business device, quasi-real-time high-accuracy orbital information of the representative satellite and orbital information relative values of constituent satellites other than the representative satellite, relative to the representative satellite;

sharing, by the space traffic management device in the mega-constellation business device, the quasi-real-time high-accuracy orbital information of the representative satellite and the orbital information relative values of the constituent satellites relative to the representative satellite, with the space traffic management device mounted in the second business device;

recording, in the second business device, the quasi-real-time high-accuracy orbital information of the representative satellite, the orbital information relative values of the constituent satellites relative to the representative satellite, and information of the space object, the quasi-real-time high-accuracy orbital information and the orbital information relative values being acquired from the space traffic management device mounted in the mega-constellation business device, the information of the space object being acquired from the space traffic management device mounted in the first business device, wherein the second business device includes a danger analysis device and a danger avoidance action assist device;

deriving, by the danger analysis device, collision avoidance information including a timing or a condition at which or under which collision does not occur with any one of satellites included in the mega-constellation satellite group;

notifying, by the danger avoidance action assist device, the first business device of the collision avoidance information, and controlling at least one of the satellites in the mega-constellation based on the collision avoidance information.

2. The space traffic management method according to claim 1, wherein the mega-constellation business device includes a plurality of mega-constellation business devices each of which manages a mega-constellation, wherein the first business device is a space object business device of an unsteady-operation space object, wherein the second business device is a collision avoidance assist business device, wherein the collision avoidance assist business device records the quasi-real-time high-accuracy orbital information of the representative satellite, the orbital information relative values of constituent satellites relative to the representative satellite, and planned orbital information being information of the space object, to the space information recorder, the quasi-real-time high-accuracy orbital information and the orbital information relative values being acquired from the space traffic management devices mounted in individual ones of the plurality of mega-constellation business devices, the planned orbital information being acquired from the space traffic management device mounted in the space object business device, wherein the danger analysis device derives, as the collision avoidance information, a timing and an orbital condition at which and under which collision does not occur with any one of the satellites included in the mega-constellation satellite group, and wherein the danger avoidance action assist device notifies the space object business device of the timing and the orbital condition.

3. The space traffic management method according to claim 1, wherein the mega-constellation business device includes a plurality of mega-constellation business devices each of which manages a mega-constellation, wherein first business device is a rocket launch business device, wherein the second business device is a rocket launch assist business device which assists rocket launch, wherein the rocket launch assist business device records the quasi-real-time high-accuracy orbital information of the representative satellite, the orbital information relative values of the constituent satellites relative to the representative satellite, and rocket launch plan orbital information being information of the space object, to the space information recorder, the quasi-real-time high-accuracy orbital information and the orbital information relative values being acquired from the space traffic management devices mounted in individual ones of the plurality of mega-constellation business devices, the rocket launch plan orbital information being acquired from the space traffic management device mounted in the rocket launch business device, wherein the danger analysis device derives, as the collision avoidance information, a rocket launch timing at which collision does not occur with any one of the satellites included in the mega-constellation satellite group, and wherein the danger avoidance action assist device notifies the rocket launch business device of the rocket launch timing.

4. The space traffic management method according to claim 1, wherein the mega-constellation business device includes a plurality of mega-constellation business devices each of which manages a mega-constellation, wherein the first business device is a space object management business device for deorbiting in an orbital descent process, wherein the second business device is a collision avoidance assist business device, wherein the collision avoidance assist business device records the quasi-real-time high-accuracy orbital information of the representative satellite, the orbital information relative values of the constituent satellites relative to the representative satellite, and planned orbital information of the space object, being information of the space object, during an orbital descent process, to the space information recorder, the quasi-real-time high-accuracy orbital information and the orbital information relative values being acquired from space traffic management devices mounted in individual ones of the plurality of mega-constellation business devices, the planned orbital information being acquired from the space traffic management device mounted in the space object management business device, wherein the danger analysis device derives, as the collision avoidance information, a timing and an orbital condition at which and under which collision does not occur with any one of the satellites included in the mega-constellation satellite group, and wherein the danger avoidance action assist device notifies the space object management business device of the timing and the orbital condition.

5. The space traffic management method according to claim 1, wherein the first business device is a space object management business device or a debris removal business device, the space object management business device being capable of performing active orbital descent operation and being for an orbital descent process, wherein the second business device is a space situational awareness business device which runs a space situational awareness business, or a collision avoidance assist business device, wherein the space situational awareness business device or the collision avoidance assist business device records the quasi-real-time high-accuracy orbital information of the representative satellite, the orbital information relative values of the constituent satellites relative to the representative satellite, and orbital-descent planned orbital information of a space object debris removal satellite, being information of the space object, or of a debris removal satellite, to the space information recorder, the quasi-real-time high-accuracy orbital information and the orbital information relative values being acquired from the space traffic management device mounted in the mega-constellation business device, the orbital-descent planned orbital information being acquired from the space traffic management device mounted in the space object management business device or the debris removal business device, wherein the danger analysis device derives, as the collision avoidance information, a timing and an orbital condition at which and under which collision does not occur with any one of the satellites constituting the mega-constellation satellite group, and wherein the danger avoidance action assist device notifies the space object management business device or the debris removal business device of the timing and the orbital condition.

6. The collision avoidance assist business device employed in the space traffic management method according to claim 2, wherein the collision avoidance assist business device is a rocket launch assist device, a space situational awareness business device, a space management device such as a space port, or a business device that supervises space traffic management, and ensures flight safety by the space traffic management method according to claim 2.

7. The space object business device of an unsteady-operation space object, employed in the space traffic management method according to claim 2, wherein the space object business device is a satellite business device for an orbital descent process, a debris removal satellite for an orbital descent process, or a rocket launch business operator, and ensures flight safety by the space traffic management method according to claim 2.

8. A mega-constellation business device which ensures flight safety by the space traffic management method according to claim 2.

9. A rocket launch assist business device which ensures flight safety by the space traffic management method according to claim 3.

10. A collision avoidance assist business device which ensures flight safety by the space traffic management method according to claim 4.

11. A space situational awareness business device which ensures flight safety by the space traffic management method according to claim 5.

12. A debris removal business device which ensures flight safety by the space traffic management method according to claim 4.

13. A rocket launch business device which ensures flight safety by the space traffic management method according to claim 3.

14. An OADR (Open Architecture Data Repository) which discloses orbital information of a space object, wherein the OADR comprises the collision avoidance assist business device according to claim 10.

15. An OADR (Open Architecture Data Repository) which comprises a database to store orbital information of a space object, and a server, and discloses the orbital information of the space object, wherein the database includes a first database to store public information and a second database to store non-public information, wherein the server acquires space object information including non-public information from all or some of business devices which are: a space traffic management device to manage space traffic; a space situational awareness business device to monitor a space situation; a collision avoidance assist business device to assist avoidance of collision of a space object in space; a mega-constellation business device to manage a mega-constellation; and a debris removal business device to assist debris removal, and stores the acquired space object information to the second database, generates conditional public information restricting a publication target and a publication content and stores the generated information to the first database, and transmits the conditional public information only to a particular business device among the space situational awareness business device, the collision avoidance assist business device, the mega-constellation business device, the debris removal business device, and a space insurance business device which deals with a space insurance, and wherein the OADR mediates implementation of the space traffic management method according to claim 1.

16. An OADR (Open Architecture Data Repository) which comprises the collision avoidance assist business device according to claim 10 and discloses orbital information of a space object, wherein a database provided to the collision avoidance assist business device comprises a first database to store public information and a second database to store non-public information, and wherein a server provided to the collision avoidance assist business device acquires space object information including non-public information from all or some of business devices which are: a space traffic management device to manage space traffic; a space situational awareness business device to monitor a space situation; another collision avoidance assist business device which is other than a collision avoidance assist business device of an own OADR; a mega-constellation business device to manage a mega-constellation; a debris removal business device to assist debris removal; and a space object business device to manage a particular space object, and stores the acquired space object information to the second database,

generates conditional public information restricting a publication target and a publication content and stores the generated information to the first database, and transmits the conditional public information only to a particular business device among the space situational awareness business device, said another collision avoidance assist business device, the mega-constellation business device, the debris removal business device, the space object business device, and a space insurance business device which deals with a space insurance.

17. A space traffic management method of ensuring flight safety, comprising:

connecting space traffic management devices individually mounted in business devices with each other via a communication line, the business devices including a mega-constellation business device to manage a mega-constellation consisting of 100 or more satellites, and a debris removal business device to manage a debris removal satellite, or a rocket launch business device;

specifying, by a space traffic management device mounted in the mega-constellation business device, a representative satellite, which is a satellite selected from a mega-constellation satellite group flying on orbits having a same nominal orbital altitude;

storing, in the space traffic management device mounted in the mega-constellation business device, quasi-real-time high-accuracy orbital information of the representative satellite, and orbital information relative values of constituent satellites other than the representative satellite, relative to the representative satellite;

sharing, by the space traffic management device mounted in the mega-constellation business device, the quasi-real-time high-accuracy orbital information of the representative satellite and the orbital information relative values of the constituent satellites relative to the representative satellite, with the space traffic management device mounted in the debris removal business device or the rocket launch business device;

recording, by the space information recorder in the debris removal business device or the rocket launch business device, the quasi-real-time high-accuracy orbital information of the representative satellite, the orbital information relative values of the constituent satellites relative to the representative satellite, and orbital-descent planned orbital information of a debris removal satellite, or planned orbital information for rocket launch, the quasi-real-time high-accuracy orbital information and the orbital information relative values being acquired from the space traffic management device mounted in the mega-constellation business device;

deriving, by the danger analysis device, a timing and an orbital condition at which and under which collision does not occur with any one of satellites included in the mega-constellation satellite group; and controlling at least one of the satellites in the mega-constellation based on the quasi-real-time high-accuracy orbital information.

* * * * *